US012627587B2

(12) United States Patent
Thompson et al.

(10) Patent No.: US 12,627,587 B2
(45) Date of Patent: May 12, 2026

(54) NETWORK MANAGEMENT FOR BAND SPLITS

(71) Applicant: Comcast Cable Communications, LLC, Philadelphia, PA (US)

(72) Inventors: Robert Thompson, Quakertown, PA (US); Robert Howald, North Wales, PA (US); Lei Zhou, Havertown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 15 days.

(21) Appl. No.: 18/798,367

(22) Filed: Aug. 8, 2024

(65) Prior Publication Data

US 2025/0184254 A1    Jun. 5, 2025

Related U.S. Application Data

(63) Continuation of application No. 17/947,709, filed on Sep. 19, 2022, now Pat. No. 12,088,490.

(60) Provisional application No. 63/245,658, filed on Sep. 17, 2021.

(51) Int. Cl.
H04L 43/50        (2022.01)
H04L 12/28        (2006.01)

(52) U.S. Cl.
CPC .......... H04L 43/50 (2013.01); H04L 12/2801 (2013.01)

(58) Field of Classification Search
CPC . H04L 12/2801; H04L 43/50; H04L 41/0213; H04L 41/082; H04L 41/145; H04L 43/0823; H04L 43/16
See application file for complete search history.

(56) References Cited

U.S. PATENT DOCUMENTS

| | | | | |
|---|---|---|---|---|
| 6,389,068 B1 * | 5/2002 | Smith | ...................... | H04L 1/242 |
| | | | | 370/468 |
| 9,787,376 B2 * | 10/2017 | Zhu | ...................... | H04L 25/0204 |
| 9,900,406 B1 * | 2/2018 | Hanks | ................... | H04L 5/0085 |
| 10,873,522 B2 * | 12/2020 | Gotwals | ............... | H04L 43/028 |
| 2002/0044531 A1 * | 4/2002 | Cooper | ................... | H04L 43/55 |
| | | | | 370/252 |
| 2006/0126660 A1 * | 6/2006 | Denney | ................. | H04L 47/431 |
| | | | | 370/468 |
| 2010/0154017 A1 * | 6/2010 | An | ...................... | H04L 12/2865 |
| | | | | 725/111 |
| 2011/0185263 A1 * | 7/2011 | Chapman | ............ | H04L 12/2861 |
| | | | | 725/111 |

(Continued)

*Primary Examiner* — Jaison Joseph

(74) *Attorney, Agent, or Firm* — Banner & Witcoff, Ltd.

(57) ABSTRACT

Systems, apparatuses, and methods are described for deploying upstream bandwidth upgrade of devices per home basis. The impact of the upstream bandwidth upgrade on the devices may be pre-estimated based on remotely monitoring and/or analyzing performance data of the devices collected during transmissions of test signals (e.g., a burst of upstream transmissions) in real-time from the devices operating under different modes of operations. The burst of upstream transmissions using a small bandwidth (e.g., 1.6 MHz) may be limited to a short duration of time (e.g., 5 seconds) so that on-going services provided by the devices are not substantially interrupted. The upstream bandwidth of the devices, based on the pre-estimated impact, may be upgraded, left unaltered, or downgraded.

21 Claims, 26 Drawing Sheets

(56)         References Cited

U.S. PATENT DOCUMENTS

| | | | | |
|---|---|---|---|---|
| 2014/0282783 | A1* | 9/2014 | Totten | H04N 21/61 |
| | | | | 725/111 |
| 2015/0180726 | A1* | 6/2015 | Asati | H04L 41/0853 |
| | | | | 398/66 |
| 2015/0295684 | A1* | 10/2015 | Jin | H04L 27/345 |
| | | | | 370/390 |
| 2016/0164758 | A1* | 6/2016 | Ansley | H04N 21/23614 |
| | | | | 709/224 |
| 2018/0332345 | A1* | 11/2018 | Ibelings | H04N 21/435 |
| 2020/0162230 | A1* | 5/2020 | Kol | H04L 27/0002 |
| 2021/0351899 | A1* | 11/2021 | Shelby | H04B 3/21 |
| 2021/0377064 | A1* | 12/2021 | O'Keeffe | H04L 12/2801 |
| 2023/0090396 | A1* | 3/2023 | Thompson | H04L 41/082 |
| | | | | 375/257 |

* cited by examiner

OUDP Test Request

```
var oudpRequest = {
transaction_id: tid,
mac_address: {address: my_cm_mac},
ofdma_channel: 0,
iuc: 13,
center_frequency: 79900000, // 79.9 MHz
width: 1599999, // 1.6 MHz
duration: 5000 // 5 sec
};
```

OUDP Test Response

```
{
  "mac_address":{
  "address" : "60:3d:26:ab:b5:ec"
  },
  "ofdma_channel": 41,
  "iuc": 13,
  "sid": 8198,
  "tss": "1621964215804",
  "actual_grant_duration_msec": 4999,
  "center_frequency",79900000,
  "width": 1600000,
  "actual_cm_transmit_duration_msec": 4999
}
```

FIG. 5

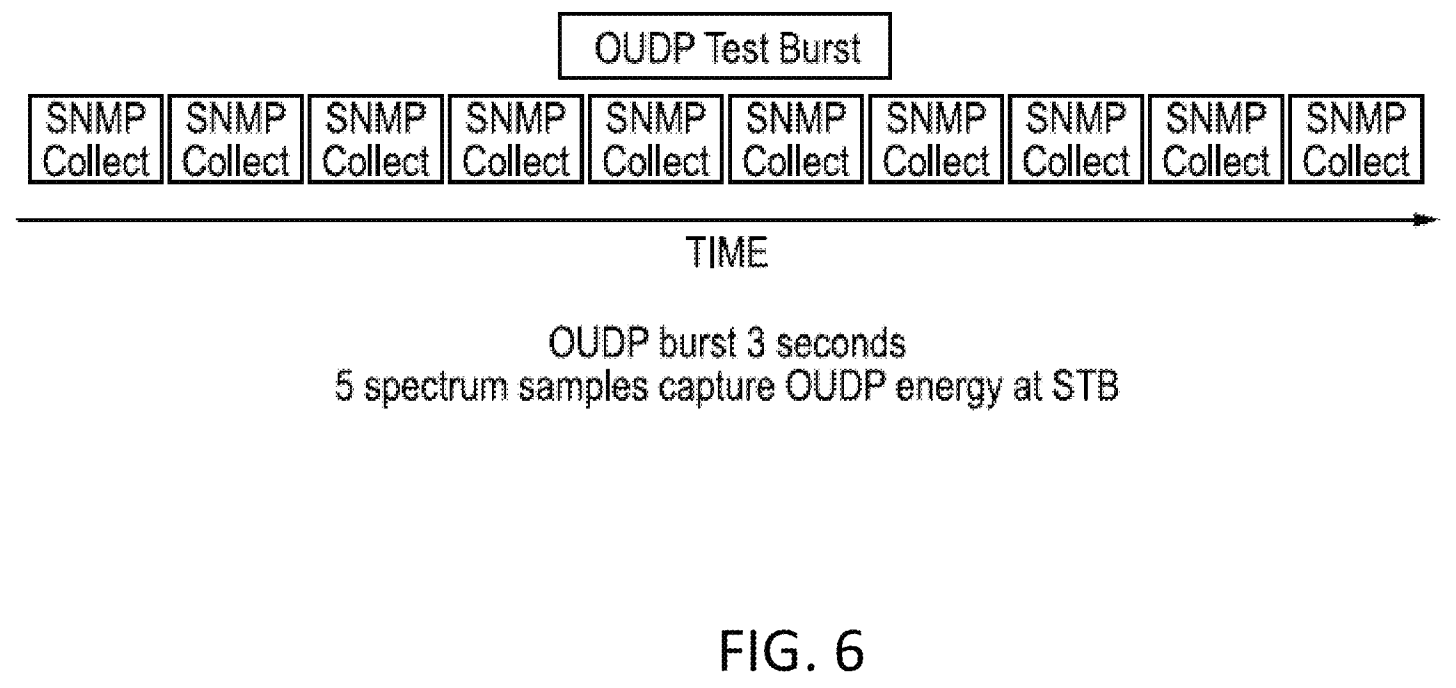

OUDP Test Burst

SNMP Collect | SNMP Collect | SNMP Collect | SNMP Collect | SNMP Collect | SNMP Collect | SNMP Collect | SNMP Collect | SNMP Collect | SNMP Collect

TIME

OUDP burst 3 seconds
5 spectrum samples capture OUDP energy at STB

FIG. 6

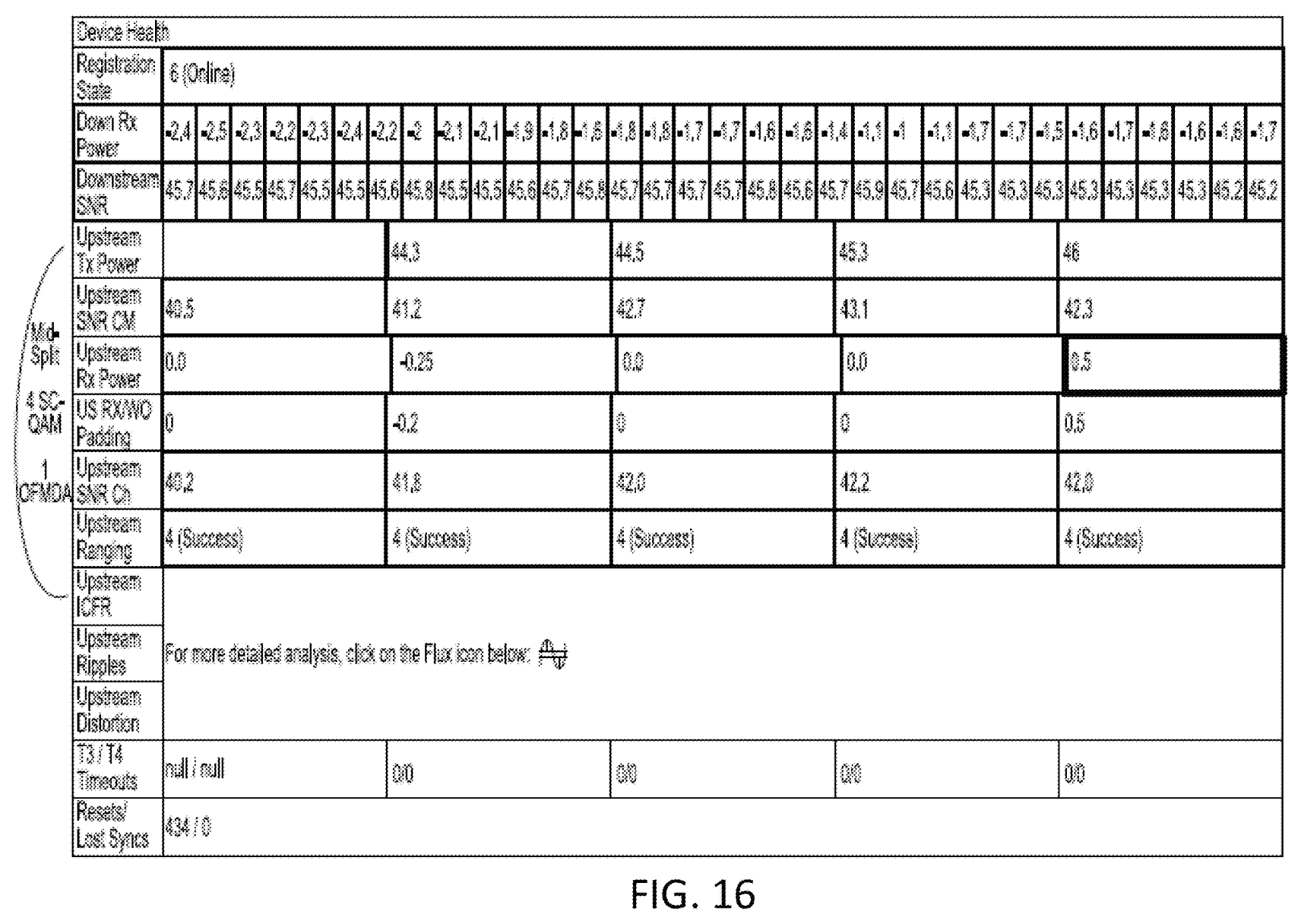

| Device Health | | | | | | | | | | | | | | | | | |
|---|---|---|---|---|---|---|---|---|---|---|---|---|---|---|---|---|---|
| Registration State | 6 (Online) | | | | | | | | | | | | | | | | |
| Down Rx Power | -2.4 | -2.5 | -2.3 | -2.2 | -2.1 | -2.2 | -2.3 | -2.1 | -1.9 | -1.8 | -1.8 | -1.8 | -1.7 | -1.6 | -1.8 | -1.7 | -1.7 |
| Downstream SNR | 45.7 | 45.6 | 45.7 | 45.6 | 45.5 | 45.6 | 45.6 | 45.6 | 45.7 | 45.8 | 45.6 | 45.7 | 45.7 | 45.9 | 45.7 | 45.6 | 45.3 |
| Upstream Tx Power | 44.3 | | | | | 44.5 | | | | 45.3 | | | | 44.6 | | | |
| Upstream SNR CM | 41.2 | | | | | 42.7 | | | | 43.1 | | | | 42.3 | | | |
| Upstream Rx Power | -0.25 | | | | | 0.0 | | | | 0.0 | | | | 0.5 | | | |
| US RXMO Padding | -0.2 | | | | | 0 | | | | 0 | | | | 0.5 | | | |
| Upstream SNR C1 | 41.8 | | | | | 42.0 | | | | 42.2 | | | | 42.0 | | | |
| Upstream Ranging | 4 (Success) | | | | | 4 (Success) | | | | 4 (Success) | | | | 4 (Success) | | | |
| Upstream ICFR | For more detailed analysis, click on the Flux icon below: | | | | | | | | | | | | | | | | |
| Upstream Ripples | | | | | | | | | | | | | | | | | |
| Upstream Distortion | | | | | | | | | | | | | | | | | |
| T3/T4 Timeouts | null / null | | | | | 0.0 | | | | 0.0 | | | | 0.0 | | | |
| Resets/Lost Syncs | 4534 / 0 | | | | | 0.0 | | | | 0.0 | | | | 0.0 | | | |

FIG. 16

| Device Health | | |
| --- | --- | --- |
| Registration State | 6 (Online) | |
| Down Rx Power | -1, -1, -0.9, -0.7, -0.7, -0.7, -0.7, -0.5, -0.7, -0.2, 0, -0.2, 0, 0.2, 0.4, 0.2, 0.2, 0.7, 1, 1, 0.7, 1, 1, 1, 1.1, 1.2, 1.2 | |
| Downstream SNR | 40.3, 40.3, 40.3, 40.3, 40.9, 40.3, 40.3, 40.3, 40.9, 40.3, 40.3, 40.9, 40.3, 40.3, 40.3, 40.9, 40.3, 40.3, 40.3, 40.9, 40.3, 40.3, 40.3, 40.3, 40.3, 40.3 | |
| Upstream Tx Power | 45.5, 45.5, 46, 46, 46.5 | |
| Upstream SNR Qu | 45.0, 46.3, 46.3, 46.3, 43.3, 46.3, 43.8 | |
| Upstream Rx Power | 0.0, 0.0, 0.0, 0.0, 0.0, 0.0, 0.25 | |
| US RxMWO Padding | 0, 0, 0, 0, 0, 0, 0.2 | |
| Upstream SNR Qu | 45.2, 43.1, 43.1, 42.9, 42.8, 43.03, 42.3 | |
| Upstream Ranging | 4 (Success), 4 (Success), 4 (Success), 4 (Success), 4 (Success), 4 (Success), 4 (Success) | |
| Upstream CFR | For more detailed analysis, click on the Flux icon below. | |
| Upstream Ripples | | |
| Upstream Distortion | | |
| T3/T4 Timeouts | null / null, 19970, 16680, 16610, 10430 | |
| Resets / Last Syncs | 0 / 0 | |

High-Split, QSC-QAM, 2 OFMDA

FIG. 17

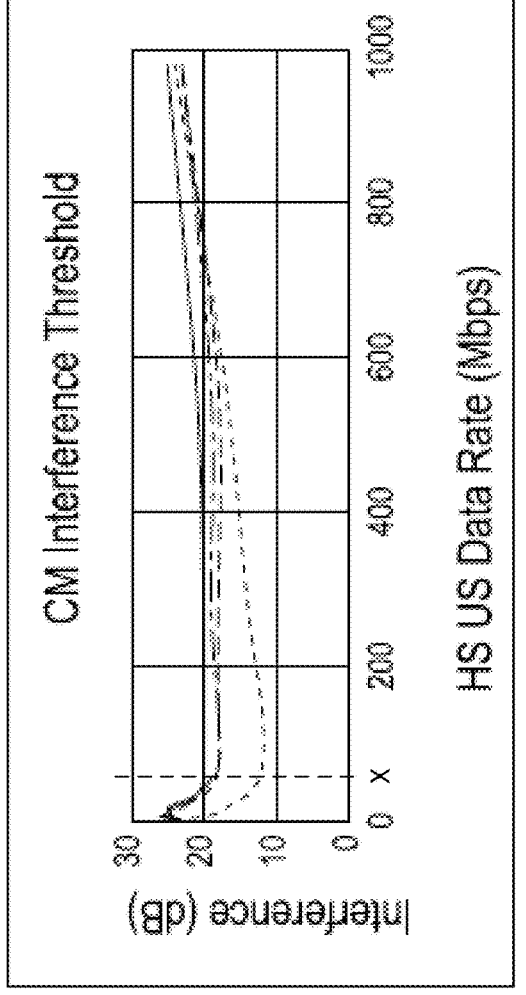
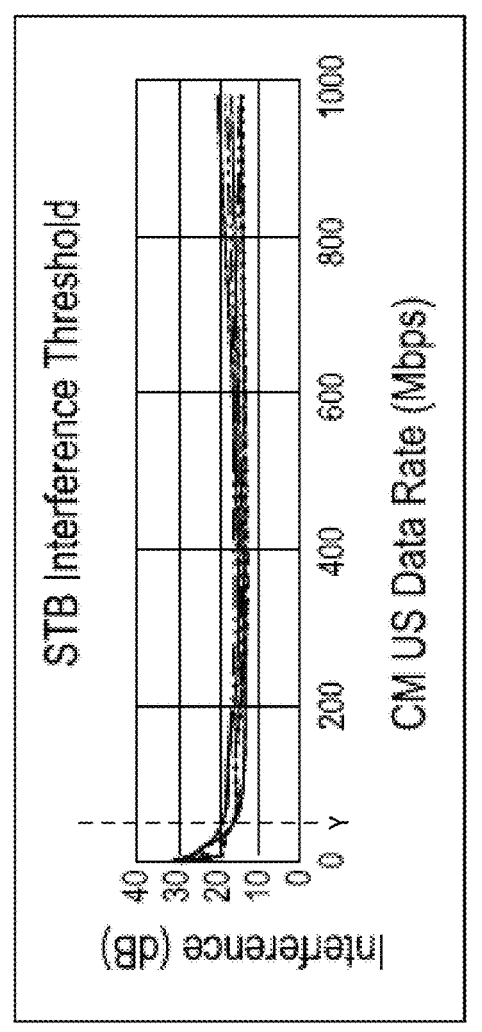
FIG. 22

Sample RHM Data failures ▯

FIG. 25

NETWORK MANAGEMENT FOR BAND SPLITS

CROSS-REFERENCE TO RELATED APPLICATION

This application claims the benefit of U.S. Provisional Application No. 63/245,658, filed on Sep. 17, 2021. The above-referenced application is hereby incorporated by reference in its entirety.

BACKGROUND

Interactivity-intense applications, including gaming, video sharing, and teleconferencing have become increasingly popular, resulting in higher demand for upstream bandwidth over a cable network. Expanding range of the upstream bandwidth to meet the higher demand may face a number of challenges: imperfect isolation of the upstream bandwidth from downstream bandwidth may cause signal leakages and interferences. Further, operations to expand the range may involve installations of hardware equipment as well as trouble-shooting in customer premises. Such operations are costly and may interrupt services to customers. There is a need for inexpensive and non-interruptive ways to deploy expanded ranges of the upstream bandwidth.

SUMMARY

The following summary presents a simplified summary of certain features. The summary is not an extensive overview and is not intended to identify key or critical elements.

Systems, apparatuses, and methods are described for upgrading upstream bandwidth of devices, on a per home basis, without disrupting on-going services provided via the devices. The upstream bandwidth may be increased and/or upgraded after determining that the devices will not be negatively impacted (e.g., by signal interference and/or noise) by such increase and/or upgrade, or after determining that such impact is within acceptable limits. To determine impact, the performance of the devices at user premises may be remotely monitored and/or analyzed in real-time, for example, using a remote controlling and monitoring tool. The performance of the devices may be estimated and/or predicted based on monitoring and/or analyzing test signals (e.g., bursts of upstream transmissions) from the devices, which may operate under different modes of operation (e.g., low-band split mode, mid-band split mode, high-band split mode, etc.). The bursts of upstream transmissions (e.g., orthogonal frequency-division multiple access (OFDMA) upstream transmissions) may be limited to a short duration of time (e.g., 5 seconds) and a small bandwidth (e.g., 1.6 MHz) to minimize and/or prevent affecting transmissions associated with the on-going services provided by a device. The upstream bandwidth of the devices, based on the estimated performance, may be increased, left unaltered, or decreased. Also or alternatively, troubleshooting may be performed to address issues (e.g., partial service issue or blocked channel issue, etc.) associated with the upgrading upstream bandwidth. Various sources (e.g., incorrect plant maps, incomplete amplifier cascade upgrade, incorrect outside plant or multi dwelling unit raiser amplifiers, in-line equalizers, drop amplifiers, etc.) causing the issues may be identified, for example, with aid of the remote controlling and monitoring tool.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5 shows an example of an orthogonal frequency-division multiple access (OFDMA) upstream data profile (OUDP) test request and an OUDP test response.

FIG. 6 shows an example of simultaneous mid-split CPE (MS-CPE) OUDP burst and standard-split CPE (SS-CPE) simple network management protocol (SNMP) data collection.

FIG. 16 shows an example of a mid-split screen capture with 4 single carrier quadrature amplitude modulations (SC-QAMs) and 1 OFDMA.

FIG. 17 shows an example of a high-split screen capture with 4 SC-QAMs and 1 OFDMA.

FIG. 22 shows an example of CM & STB interference: threshold vs neighboring high-split throughout for several different models of STBs.

FIG. 25 shows an example table of sample RHM data.

DETAILED DESCRIPTION

Figure 1:
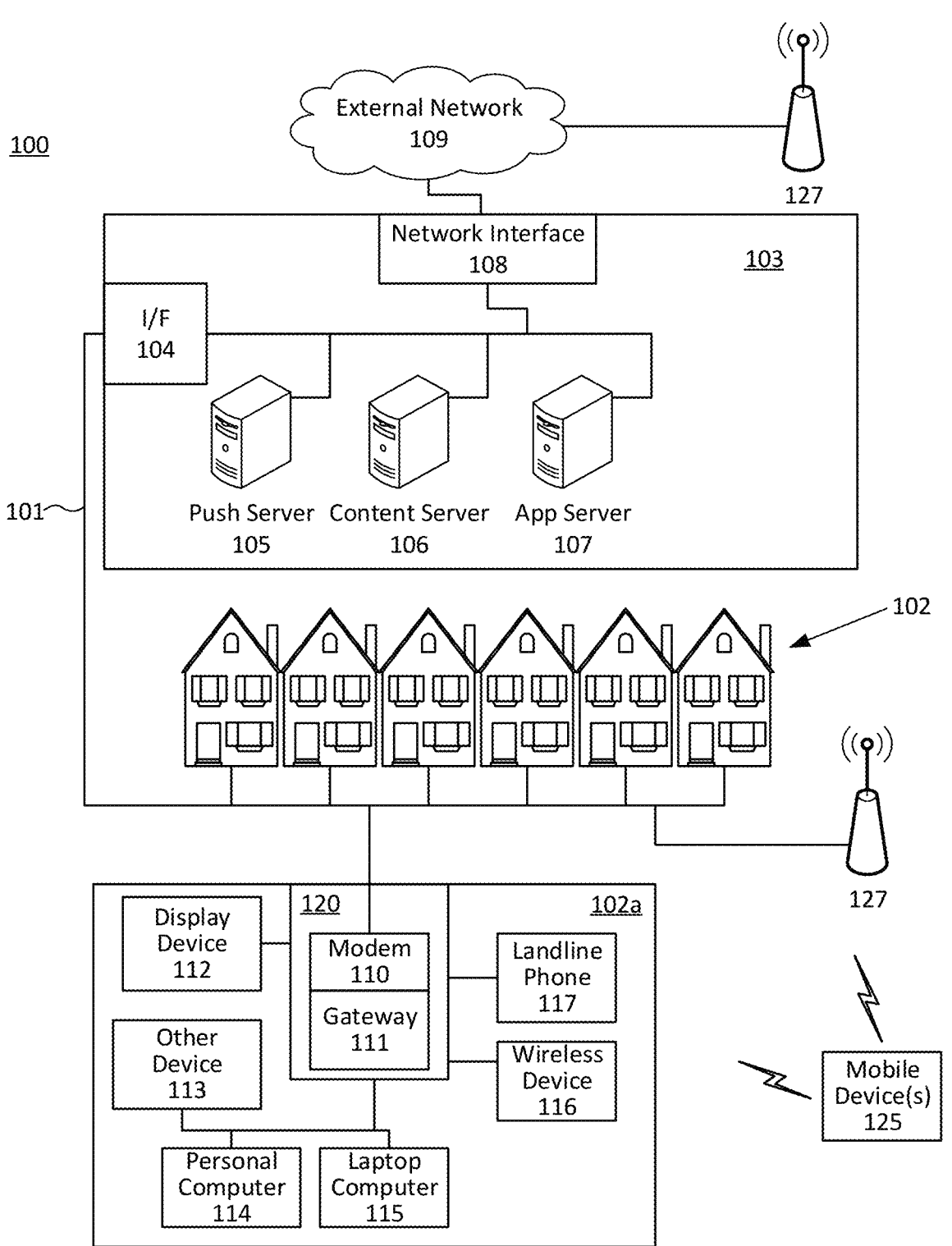
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced. For convenience, a table of abbreviations is included at the end of this detailed description.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. For example, the communication links 101 may comprise a hybrid fiber/coaxial (HFC) network. The HFC network may include a splitter for isolating upstream signals from downstream signals, as also described in FIG. 3. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. Yet another application server may allow operators to selectively turn on certain services, for example, remote feature control (RFC) and remote health monitoring (RHM) for proactively adjusting operation modes and class of services. The local office 103 may comprise additional servers, additional push, content, and/or application servers, and/or other types of servers. Also or alternatively, one or more of the push server 105, the content server 106, and/or the application server 107 may be part of the external network 109 and may be configured to communicate (e.g., via the local office 103) with computing devices located in or otherwise associated with one or more premises 102. Although shown separately, the push server 105, the content server 106, the application server 107, and/or other server(s) may be combined. The servers 105, 106, and 107, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA)), landline phones 117 (e.g., Voice over Internet Protocol-VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
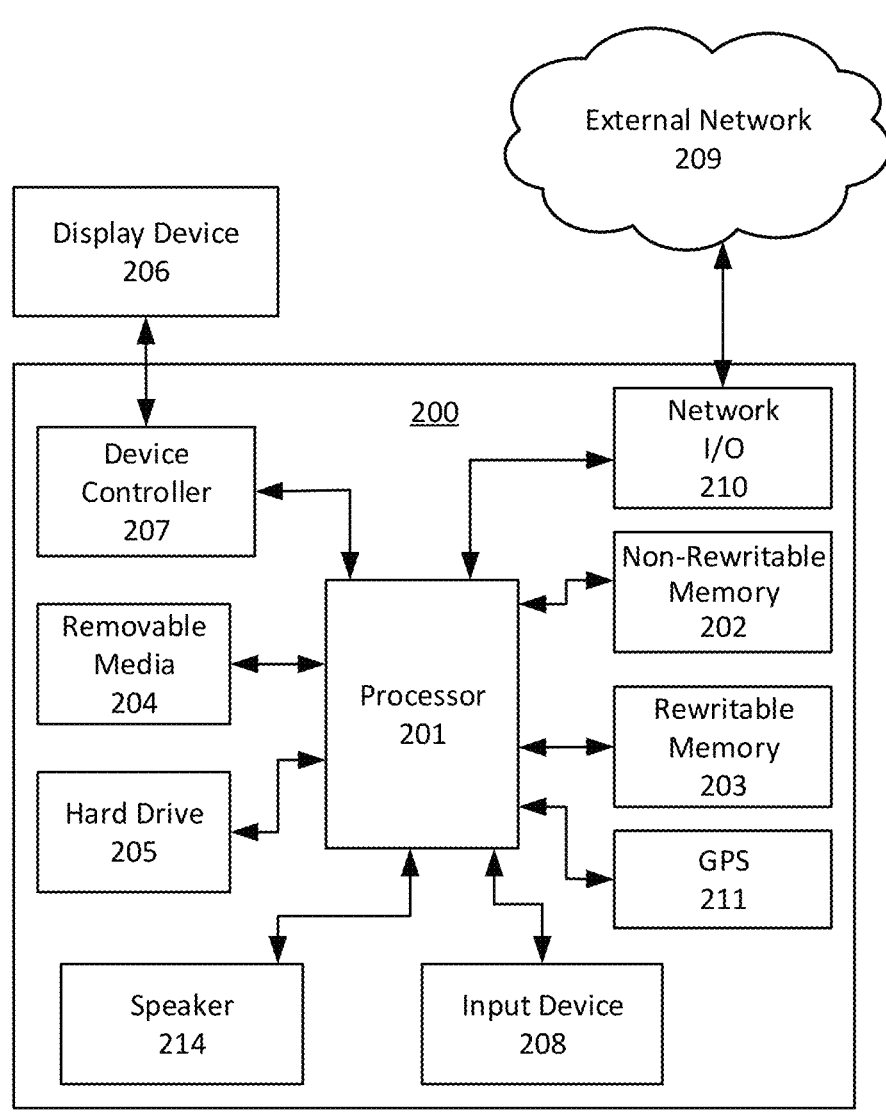
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., application server 107). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, radio frequency (RF) (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

For example, hardware elements of a computing device 200 that may be used to implement the application server 107 and/or other computing devices configured to perform operations such as are described herein. The application server 107 may support protocols such as simple network management protocol (SNMP) and/or Technical Report, 069 specification (TR-069) for allowing network operators to remotely control and/or monitor remote devices (e.g., devices in premises 102, including but not limited to customer premises equipment (CPE) such as is described herein). The application server 107 may, for example, change operation modes of CPE, collect data from CPE, and perform tests on CPE and/or other devices, cause (e.g., by sending instructions to CPE and/or other devices) tests to be performed on CPE, cause (e.g., by sending instructions to CPE and/or other devices) CPE and/or other devices to send test signals, etc.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Deployment of an expanding range of upstream split options (e.g., mid-split deployment) for the return path in coax systems (e.g., coaxial cable portions of HFC networks) has multiple challenges. Among these challenges are old infrastructure components such as drop-amps and splitters, CPE and services sharing common or overlapping spectrum. One or more systems and/or methods that leverage remote feature control (RFC) and remote health monitor (RHM) are presented. These systems and/or methods may selectively enable enhanced return path high-speed internet service (HSI) for cable modems based on a quality of service (QOS) measurement from CPEs in the household.

One or more systems and/or method may, for example, based on data-over-cable service interface specifications (DOCSIS) type-length-value84 (DOCSIS_TLV84), remotely enable mid and high-split. At the same time, by the systems and/or method, downstream and upstream performance metrics, such as signal-to-noise ratio (SNR), modulation error ratio (MER), and other metrics may be remotely monitored from CPEs devices within the home and, in the case of high-split and full duplex (FDX), within neighboring homes as well, to evaluate potential disruption of revenue generating services. Households may be scored to determine whether they are capable of self-installation of enhanced HSI services. The advantage of the systems and/or method may include allowing: 1) scalable individualized and progressive HSI deployment with a remediation strategy focused on customer networks where potential issues may exist and 2) proactive and adaptive network operations in accordance to a varying environment thus minimizing trouble calls, truck rolls, and customer contact.

DOCSIS has been a frequency-division duplex (FDD) access scheme, in that the upstream and downstream transmissions may occupy different bands of the spectrum, for example, specified by different versions of DOCSIS (e.g., DOCSIS 2.0, DOCSIS 3.0, or DOCSIS 3.1). Standard-split operates in the 5-42 MHz band for the upstream transmission and has been deployed in operator networks. Standard split has served operators well, enabling them to provide their customers with up to 35 Mbps upstream capacity since the late 1990s.

CableLabs has provided multiple options for enhancing upstream capacity with multiple versions of DOCSIS. DOCSIS 3.0 introduced the 85 MHz upstream option, which may include the ability to increase upstream capacity via channel bonding. DOCSIS 3.1 may use upper edges of the upstream band to include 85 MHz and 204 MHZ, so named mid-split and high-split, respectively. DOCSIS_4.0 may introduce full-duplex DOCSIS (FDX) that may allow upstream and downstream transmissions to share the same spectrum band where the new upstream band edge may extend to 684 MHz.

The mid-split scheme may double the upstream bandwidth of the standard-split scheme, which immediately translates to an augmented capacity and increased quality of service. Since operators may limit their use of the standard split band to primarily the upper two-thirds of the band, the mid-split may represent nearly a 3× increase in useable bandwidth. Four 6.4 MHz single carrier quadrature amplitude modulations (SC-QAM) upstream channels may be configured in the 5-42 MHz band, providing 122 Mbps data rate with 64-QAM modulation. The mid-split scheme may be able to add four more SC-QAM channels and offer a total upstream data rate of about 250 Mbps.

Alternatively, the mid-split scheme may allow configurations of advanced orthogonal frequency-division multiple access (OFDMA) upstream channels. For example, a 48 MHz wide OFDMA channel may enable a 500 Mbps upstream data rate with 2048-QAM modulation. With another bandwidth doubling offered by the high-split scheme, more than 1 Gbps of upstream data rate may be achieved.

The upstream may evolve from standard-split, to mid-split, to high-split, and beyond. The data collected and/or analyzed from increasing capacity, for example, from standard-split to mid-split, may be applied for increasing capacity from mid-split to high-split. For example, the challenges for mid-split upgrade may reflect the challenges for high-split upgrade, and so on. Solving these challenges with new innovative approaches may set operators up for methods and processes for deployments of even higher capacity upstream.

The relatively limited upstream bandwidth of the standard-split has been serving customer needs of internet access, from web surfing to video streaming. Interactivity-intense applications, including gaming, video sharing and teleconferencing have become increasingly popular, especially since the COVID-19 pandemic and work-from-home have become a new normal for customer households, resulting in higher demand for new upstream bandwidth. This trend has accelerated changing the DOCSIS network to the mid- or high-split.

Deployment of the mid-split may involve re-allocation of the spectrum used by existing services. For example, video services on standard electronic industries association (EIA) channels 2 to 6 with carrier frequencies 57-87 MHz may be moved to make space for mid-split upstream channels. The cable plant also may need upgrades of the diplexers used in active devices, including nodes, line extenders, trunk amplifiers, and even in-home drop amplifiers. These products may support specifications for mid-split between the forward and return bands. The above elements may be challenges in and of themselves. However, the problem may be in the customer premise, where a mid-split capable gateway and legacy standard-split set-top boxes (STBs) may seamlessly coexist. The mid-split capable gateway may cause interference to the legacy standard-split STBs due to adjacent channel interference (ACI) susceptibility.

Standard-split customer premises equipment (SS-CPE) may include video set-top boxes (STBs), pre-DOCSIS 3.0 cable modems (CMs), and DOCSIS 3.0 CMs with fixed standard-split diplex filters. Mid-split CPE (MS-CPE) may be designed with software-selectable diplex filters which may switch between the standard-split and mid-split modes. Within a customer premises, CPE devices may be connected to the cable feed off of a splitter—which, without sufficient port-to-port isolation, may allow the MS-CPE's upstream transmission to interfere with the SS-CPE. The mid-band part of the upstream signals from the MS-CPE may leak through the splitter into the downstream receiver of the SS-CPE, unfiltered. Even though spectrum re-allocations may be implemented, such that the SS-CPE may not be expecting any services in the mid-band, its tuners may be not tuned to any frequencies in that band. The leaked signals unfortunately may raise the noise floor at the radio frequency (RF) mixers and degrade the receiving SNR for downstream services. The consequences may be increased errors and deteriorating service quality. Adjacent channel interference (ACI) susceptibility is a term used for this type of indirect interference.

It may appear straightforward to solve this SS-CPE and MS-CPE coexistence problem by simply replacing the splitters with ones with higher isolation specifications. This solution may turn out to be prohibitively expensive, as it may not be an easy customer self-installation procedure, e.g., truck-rolls may be needed, especially in the cases where there may be multiple home devices, or when drop amplifiers may be used. It may be also unnecessary to blindly replace the splitters in customer premises, as only a portion of the customer premises may have experience-impacting effects due to the interference.

When systems allow, increasing the downstream transmission power may also help mitigate this ACI problem.

However, most cable operators may have already maxed out downstream RF output power for other reasons, for example, to achieve household-per-node efficiencies. Therefore, increasing node output power may not be always practical, and a whole-plant calibration for stable operations may be applicable.

Deployment of the mid-split at the headend, in the cable plant and at the customer premises may be a gradual procedure. A progressive and adaptive approach may be one in which the mid-split mode may be "turned on" at customer premises, individually, and based on their unique site conditions, which may be more efficient and beneficial from an operator's perspective. Modern internet protocol (IP)-based CPEs may be mostly capable of remote feature control (RFC) and remote health monitoring (RHM). Enabling protocols such as simple network management protocol (SNMP) and technical report, 069 specification (TR-069) may allow network operators to selectively turn on certain services, based on viability, and continuously monitor the quality of services, so as to proactively adjust operation modes and class of services.

Disclosed herein are, for example, systems and/or methods for mid-split deployment, which systems and/or methods may focus on the SS-CPE and MS-CPE coexistence problem. Applying a number of existing RFC and RHM technologies, one or more of these methods may include a proactive on-line evaluation of network conditions and service quality, and thus may allow isolating sites suffering the coexistence interference without requiring an installer to be on-site. Such methods may support a progressive mid-split turn-on in a home-individualized and cost-effective manner. The SS-CPE and MS-CPE coexistence problem and methods of online detection of the coexistence problem are described in detail. Data from a field trial and other similar use cases are also described.

Figure 3:
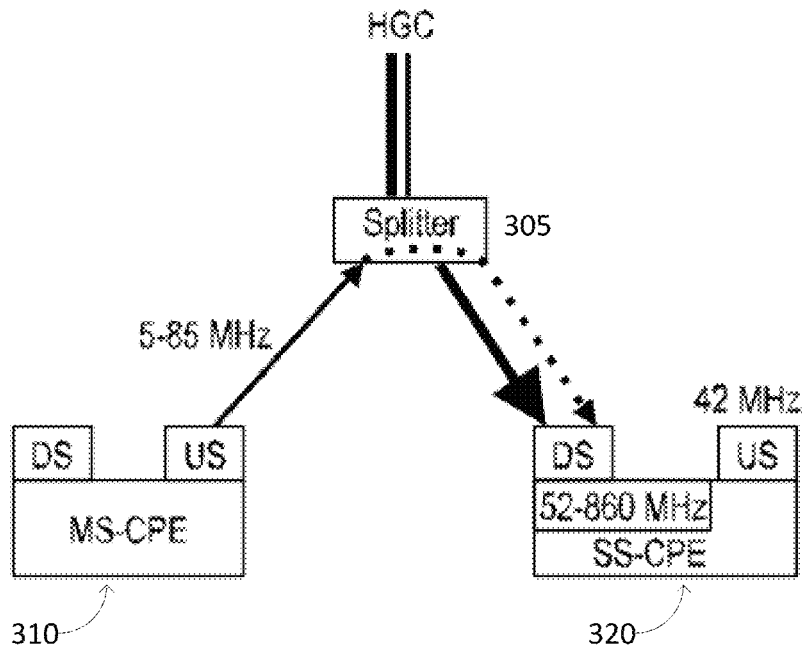
FIG. 3 shows an example of coexistence of mid-split cable modem (MS-CM) and pre-data-over-cable service interface specifications (DOCSIS) customer premises equipment (CPE).

FIG. 3 shows an example of a configuration in a customer premises (e.g., a premises 102) with coexisting user devices (e.g., MS-CPE 310 and SS-CPE 320). The MS-CPE 310 and SS-CPE 320 may share the cable feed (e.g., a coaxial cable) through a splitter 305. The MS-CPE 310 and SS-CPE 320 may be in a coaxial portion of a hybrid fiber-coax (HFC) network. The MS-CPE 310's upstream may operate in the 5-85 MHz band, while the SS-CPE 230's diplexer may cut off 54 MHz and above for downstream traffic. With imperfect isolation of the splitter 305 output ports, the MS-CPE 310's upstream signal may leak into the SS-CPE 320's downstream RF front end. Even when careful spectrum arrangement avoids the 54-85 MHz band being used by any services for the SS-CPE 320, the leaked signal from the MS-CPE 310 upstream may result in increased noise floors at the SS-CPE 230's demodulator, which consequently may cause the SNR to deteriorate, bit error rate and/or modulation error ratio (BER and/or MER) to degrade, and ultimately service quality to be impaired.

An estimate of a dominant noise floor increment may be as follows: the maximum transmission power of a 6.4 MHz DOCSIS 3.x SC-QAM upstream is 51 dBmV per 5.12 MHz; note that the maximum modulation bandwidth is 5.12 MHz. Assume the splitter port-to-port isolation is of a typical value of 30 dB. The mid-band upstream signals from the MS-CPE 310 may generate 51−30=21 decibels relative to one millivolt (dBmV) per 5.12 MHz interference the SS-CPE 320's downstream receiver. If the downstream bandwidth is of nominal value 800 MHZ, the interference may add a noise of level $$21 - 10\log_{10}\left(\frac{800}{5.12}\right) \approx -1.9 \text{ dBmV per MHz.}$$

For a 6 MHz QAM channel, the increment of the noise power at the tuner would be $-2+10\log_{10}6 \approx 5.8$ dBmV.

Assume that the SS-CPE 320 uses a minimum of 30 dB for satisfactory quality of services (e.g., SNR satisfying a threshold); and that the cable plant may be calibrated such that the CPE is of mean 40 dB and variance 32. With these conservative parameters, one may expect that about 10% of a population of SS-CPEs such as SS-CPE 320 may suffer impairment to quality of services due to the 5.8 dBmV SNR degradation.

The interference to SS-CPE 320 may not necessarily come from the MS-CPE 310's upstream transmissions directly. Even when there may be no upstream channels configured within the mid-band of 42-85 MHz, the spurious emission of the existing upstream transmissions in the band of 5-42 MHz may still fall in the mid-band and leak to the receiver of the SS-CPE 320, in the form of interference.

To target the root cause of the described problem, a solution may be to replace the splitter with one of higher port-to-port isolation specifications. For example, if a splitter of 40 dB port-to-port isolation is used, in the above calculation, the SNR degradation may become practically negligible. But replacing splitters in customer premises may not be easy self-installation procedures for customers. Complex on-site work by technicians may be necessary if, for example, the splitters are in hard-to-reach places. A solution based on replacing splitters may become prohibitively expensive if it has to be executed for every customer premises. It may be also inefficient based on the estimated percentage of the affected population.

An efficient solution may be proactive and individualistic. Proactivity may comprise remotely measuring the radio frequency (RF) and network performance of the customer premises on site and in real time. Individualism may comprise the mid-split mode being turned on or off for each customer premises individually, based on its unique RF and network conditions. A method for mid-split deployment may employ RHM and RFC technology to decide the mid-split readiness per customer premises and may make a progressive deployment.

Figure 4:
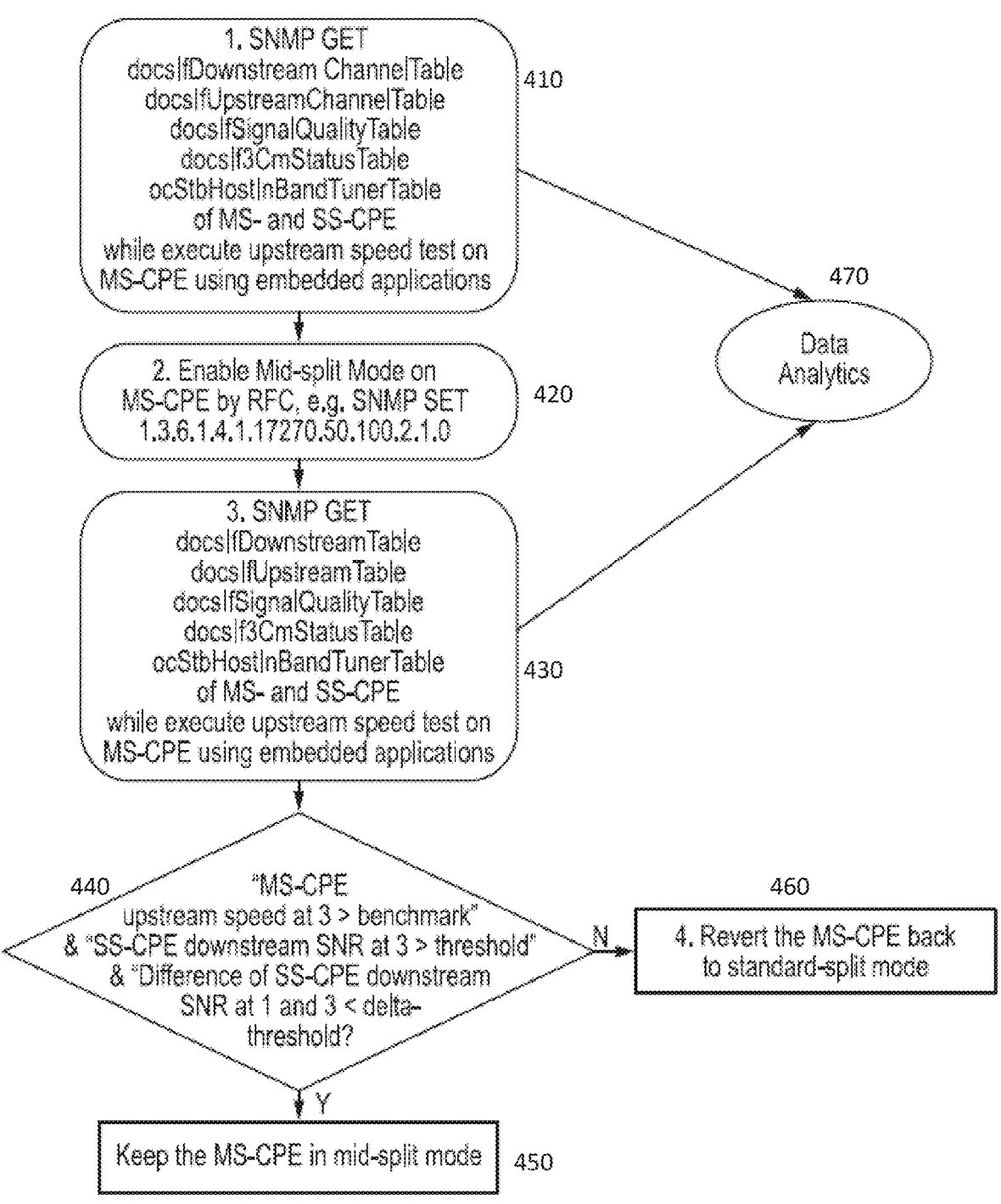
FIG. 4 shows an example of a remote feature control (RFC) and remote health monitor (RHM) procedure for mid-split deployment.

FIG. 4 shows an example of an abstracted procedure of a method for mid-split deployment. FIG. 4 is described by way of an example in which the steps are performed by a computing device (e.g., application server 107). One, some, or all steps of the example method of FIG. 4 may be omitted, performed in other orders, and/or otherwise modified, and/or one or more additional steps may be added. Step 410 may comprise using SNMP to get data (e.g., upstream and downstream metrics) from user devices (e.g., the MS-CPE 310 and SS-CPE 320), particularly under controlled upstream traffic that has been triggered using a speed test application. At step 410, a user device (e.g., the MS-CPE 310) may operate in a first operation mode (e.g., low-split mode) in which the user device is configured to use a first portion of a communication medium bandwidth for upstream transmission. For example, the upstream and downstream metrics may include downstream channel information, upstream channel information, signal quality information, cable modem (CM) status information, and/or in band tuner information of MS-CPE and SS-CPE. The data obtained at step 410 may serve as a baseline for evaluating the improvements and impacts of a mid-split spectral allocation. Step 420 may comprise turning on mid-spit mode on the MS-CPE 310. This may also be achieved through SNMP, by setting the management information base (MIB) object identifier (OID). The MIB OID may include series of integers separated by periods (e.g., 1.3.6.1.4.1.17270.50.100.2.1.0) corresponding to a path from a root through a series of ancestor nodes, to a node (e.g., MS-CPE). Step 430 may comprise repeating step 410 after mid-split mode has been enabled. At step 403, the user device (e.g., the MS-CPE 310) may operate in a second operation mode (e.g., mid-split mode) in which the user device is configured to use a second portion of the communication medium bandwidth for upstream transmission, wherein the second portion is larger than the first portion. At step 440, data from step 430 and step 410 may be compared and the mid-split readiness of the studied customer premises may be determined, for example, by the operators. For example, the data may include upstream speed after enabling of mid-split mode, SS-CPE downstream signal quality (e.g., SNR) after enabling of mid-split mode, and/or difference between SS-CPE downstream signal quality before and after enabling of mid-split mode. The upstream speed after enabling of mid-split mode may be compared against a speed benchmark. The SS-CPE downstream signal quality may be compared against a quality threshold. The difference between SS-CPE downstream signal quality before and after enabling of mid-split mode may be compared against a delta-threshold. Based on one or more of these companions, the site associated with the MS-CPE 310 and the SS-CPE 320 may stay in mid-split mode at step 450; otherwise, the site may be reverted to standard-split mode at step 460. The speed test application performed at step 410 and 430 of the method may provide a direct measure of the performance merits of the bandwidth augmentation brought about by the mid-split. It may also facilitate the evaluation of impairments to the SS-CPE 320 by the MS-CPE 310 as an emulated interference.

Methods such as the method of FIG. 4 may be performed for multiple premises (e.g., for each customer premises). The data from a large number of customer premises, correlated with media access control (MAC) domains and other geographic information, may offer an inference of the network readiness for mid-splits at a larger scale. Potential issues in network components, such as standard split drop amplifiers blocking mid-split upstream transmissions, may be isolated.

Note that the above method may exemplify a usage of some standard RHM technology, such as the DOCSIS and OpenCable MIBs. Other technologies, such as TR-069, may be also applicable, if corresponding data models are supported by the CPE. The speed test application may be generally proprietary, which, nevertheless, may be widely embedded in CPE firmware. Because running speed tests may affect customer experience, the data collection steps may be better performed during scheduled maintenance windows.

Described are several trial cases of application of the above proactive network management method in mid-split deployment at various levels. In a full-fledged mid-split deployment trial, the RHM had focused on noise level increases in the downstream band in the coexisting case. The docsIfSigQTable MIBs of a standard-split equipment (e.g., SS-CPE 320) were specifically used as a sampling of the downstream spectrum at the 8-24 downstream frequency points. It was predetermined that if a mid-split equipment (e.g., MS-CPE 310) would fall into a partial-service mode (e.g., indicating standard-split drop amplifier issues), or a standard-split equipment (e.g., SS-CPE 320) downstream SNR would drop below some threshold level (e.g., indicating splitter isolation or adjacent channel interference (ACI) susceptibility issue), the customer premises would be failed for the mid-band mode.

Sixty-three customer premises were selected for the trial. Automated RHM and RFC activities take about 30 minutes. The trial results are shown in Table 1:

TABLE 1

| Results of Eight Upstream Trial | |
| --- | --- |
| Results | Automated Testing |
| Pass (SIK) | 65% (41 of 63 customer premises) |
| Fail (Drop Amp) | 29% (18 of 63 customer premises) |
| Fail (Isolation) | 6% (4 of 63 customer premises) |

In another trial, the impact of spurious emissions of a mid-split equipment on video STB SC-QAM is evaluated. The objective of this trial was not to add upstream channels in the 42-85 MHz band, but to enable mid-split mode on a mid-split equipment (e.g., MS-CPE 310) in a standard-split plant. Its purpose was to evaluate the interference resulting from spurious emissions of the mid-split equipment (e.g., MS-CPE 310) to a coexisting standard-split equipment (e.g., SS-CPE 320). Note that even the mid-split equipment's transmission in the 5-42 MHz band may generate spurs in 42-85 MHz band, which leak to the coexisting standard-split equipment's receiver. Therefore, the method described earlier may be readily applicable.

The mid-split equipment involved in the trial were DOCSIS 3.1 cable modems, and the coexisting standard-split equipment were set-top boxes. The metrics of interest in this trial were primarily the quality impairments of QAM videos on electronic industries association (EIA) channels 2-6. The MIB ocStbHostInBandTunerSNR Value had been specifically used for RHM. To make the coexisting standard-split equipment tune to the designed channel between 2-6, a proprietary remote tune application was also used.

Figure 25:
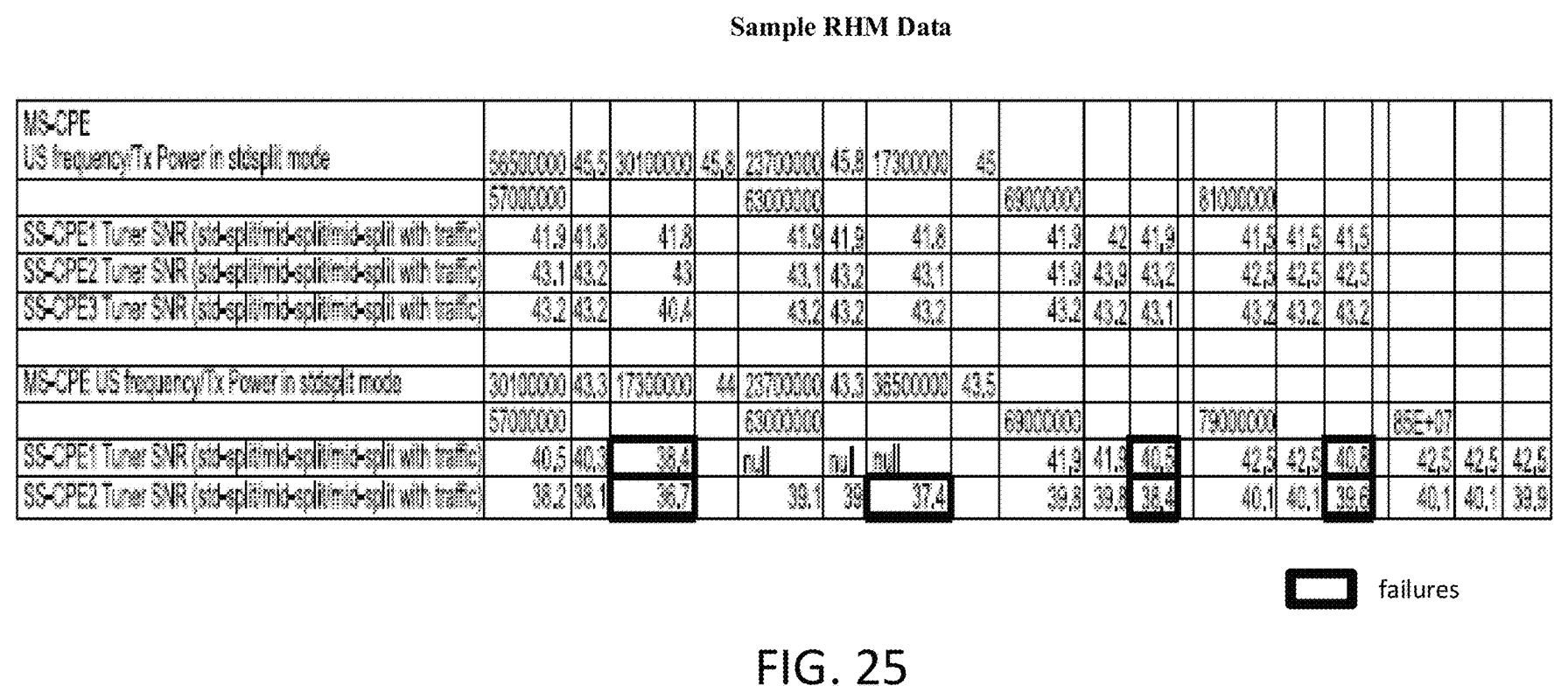

FIG. 25 shows an example table of Sample RHM Data based on the above described trial. Twenty-one geographically-dispersed customer premises were selected. Automated RHM and RFC activities took about 45 minutes. Twenty premises showed no SNR degradation, and one suffered about a 2 dB SNR drop. Sample data of passed premises and failures (bold rectangles) are presented in the table of FIG. 25.

This implies that future CPE deployments may continue to use a switchable diplexer, but using mid and high-split switchable CPE instead of low and mid-split switchable variations. This method may not only minimize the variations in future CPE products, but also maintain high levels of return on investment in CPE to enable service growth, as customers may progress from 100 Mbps to 1 Gbps upstream services.

Another trial involved the $5^{th}$-upstream. The $5^{th}$-upstream is a 3.2 MHz wide channel with center frequency at 41.3 MHz; so, part of its spectrum is above 42 MHz. The purpose of this configuration is to increase the upstream bandwidth of the SS-CPE 320 as well as the MS-CPE 310. The transient band of the SS-CPE 320's diplex filter, combined with adaptive equalizer, may provide a sufficient 3.2 MHz wide frequency-flat channel. The RHM focus may be on the partial service status, as well as spurious emissions to the 57-87 MHz band as discussed in the previous use cases.

The above use cases may represent the tip of the iceberg when it comes to using online tools for solving a variety of challenges associated with enhancing upstream capacity. There may likely be multiple opportunities to reuse the tools discussed above to solve new, but similar, challenges associated with high-split and FDX.

The above shows proactive and/or adaptive network management methods which may employ RHM and/or RFC to allow for progressive and individualistic deployment of a wider upstream signal path to mid-split frequency allocations, as it may relate to the customer premises. The methods may be generic, such that various RHM and RFC technologies may be plug-and-play. Besides automatic mid-split enablement on a per-home basis, the methods also may afford data analytics 470 of FIG. 4 for a network service quality.

This disclosure includes examples for mid-split deployment. Yet the proposed methods may be equally applicable to high-split cases. As the high-split scheme may be deployed in the virtual cable modem termination system (vCMTS) and/or remote-physical layer (R-PHY) architecture and with OFDMA upstream channels, additional RHM tools may be needed and be available for the proactive network management tasks.

For rapid and automated production scale activation of expanded upstream bandwidth, enabling the upstream portion of the access network for mid-split or high-split may take more effort than just configuring the cable modem termination system (CMTS) to activate new DOCSIS carriers. Without considering the potential consequences of in-home networks and their effects on DOCSIS and video services, the activation of expanded upstream bandwidth may interfere with services to customers or field operations. The performance of the access network may be remotely measured and observed through telemetry available in the access network. Operators may use algorithms to predetermine if there is work to be done in the field or home to enable new spectrum.

Although various tools are helpful in keeping technicians out of homes to make measurements, they may be designed for raising flags, enabling swivel chair dashboards, or troubleshooting specific cases. By contrast, turn-up of network spectrum may initiate action instantaneously at large scale, through multiple permutations, and publish essential data and actions cross-functionally to stakeholder organizations such as sales, technical operations, care, and even warehouse operations.

Instead of reacting to consequences or relying on manual vetting of homes, software running on modernized cloud infrastructure may proactively identify blockers, on an individual customer basis, but in massive scale with machine robustness that may be immune to human error. The cloud software may provide connective tissue between the upgraded network infrastructure and the incumbent suite of tools currently used by operations. This approach may facilitate seamless interaction with the customer experience by maximally enabling new services and identifying blockers to frontline teams to optimize efficiency of support.

The work and development in upgrading the plant and services to mid-split may be directly related to future upstream expansion including high-split. The workstreams may continue and build off the mid-split effort. Moving the downstream spectrum to allow room for the extended upstream spectrum, the process of upgrading the physical plant with nodes and amplifiers that support different frequency splits, the deployment of OFDMA and its resultant ACI may correlate to high split deployments. The tools and processes to validate mid-split in-home ACI may be used to evaluate neighbor interference in a high split system. ACI may be dependent on in-home splitter isolation and neighbor interference may be dependent on tap-to-tap isolation. In both cases, the tools and processes may be similar. The mid or high split device may be exercised and the level of interference or effect on the adjacent or neighbor device may be measured prior to permanently moving the customer's device into mid or high split operation. In both cases methods have been developed which may be non-service and non-customer impacting or hitless.

Also disclosed herein is a cloud software architecture that may comprise the high-level algorithms used to "score" a home, and the downstream systems fed by coax systems (e.g., coaxial cable portions of HFC networks) that may enable upstream services in scale while minimizing impact to customers and maximizing efficiency of its delivery for the operator.

For rapid and automated production scale activation of expanded upstream bandwidth, an in-home health assessment tool (iHAT) having remote feature control (RFC) and remote health monitoring (RHM) may be used to orchestrate remote identifications of mid-split-capable devices that may be activated. The iHAT, a remote control and feature monitoring tool, may provide a relatively non-intrusive view into a customer's home and, on a home-by-home basis, making basically a Go-No Go declaration with respect to activating spectrum in the mid-split band for that customer's device. The iHAT may score a home's DOCSIS readiness for passing spectrum to 85 MHz, and/or its likelihood of causing video interference.

Of course, the home may not be assessed, nor the spectrum activated efficiently on a home-by-home basis, by relying on manual processes. The information for iHAT and the information for other systems to act on the iHAT outcome, may be automated, and the interfaces between iHAT and the other systems may be built for production scale activation of expanded upstream bandwidth.

On the input side, iHAT may use information from external systems to identify if a house is eligible for mid-split from an equipment standpoint, and thereby worth running iHAT at all. It may use the inventory of mid-split capable CPE on a per node basis identified so that it may target those devices to run the test. The output of iHAT—the scoring of a home's DOCSIS readiness or risk of degrading the video experience—is information that multiple other external systems may use. For example, technicians in the home may want to know what to fix if a problem related to mid-split is identified. Care agents may want to know how to diagnose a possible mid-split related issue, guide a trouble call, and dispatch the proper support. Salespersons may want to know if an upstream speed that uses mid-split capability is possible. Data sciences team may want iHAT results to populate databases to analyze trends to adjust and optimize roll-out processes and operation support.

A successful business may find ways to scale in order to stay relevant. This may be also true when applied to the telecommunications industry. The bandwidth demands of people and businesses, especially in the upstream, have been increasing dramatically year over year due to advancements in technology. To keep up with the high demand for broadband services, innovation may continue. There are some problems that may be solved by throwing people at the problem; however, when there are customer devices in the tens and hundreds of millions, this may become untenable.

In the field of software, the most basic reasons to build an automated solution have been for smart investment on resources, and finding budget efficiencies, instead of spending to do manual work year after year. The manual method may be easy and quicker to build but has its own downfall. Questions raised are 1) What may be automated? 2) What kind of automated solution may work? 3) What may define the "right" solution? 4) What platform may be optimal to architect the solution? 5) What factors may play a part in choosing and providing the solution? 6) What may be the dependencies and integrations? 7) How much of an automated solution may sustain the business growth year after year, without re-investing and redoing a lot of the work? A companion question: What about component usability, for other parts of the business?

The downside of the automated solution may be that its machines may be built and trained in a way that mimics the thought processes for human troubleshooting skills. Outcome planning involves thinking through as many of the business's use cases as possible, considering regulations, validating as many inputs and outputs as possible, implementing ways to listen and respond back to alerts, handling notifications to support the operations, and avoid potentially impacting customers.

Factors to be considered for automation may include but may not be limited to: scalability, availability, maintainability, reusability, and budget. Incoming data feeds may be well sanitized prior to entering an automation solution, so the data that comes out may have integrity for better analysis and reporting. Effective automated solutions may reduce the cost overtime.

Answering the questions raised above led to the solution for iHAT. It was started with the version 1.0 build to research, implement, test and analyze. The iHAT version 2.0 may be built based on lessons learned from the version 1.0. Some of the downfalls of version 1.0 may include: manual process, scalability, speed test failures, SNMP V3 key reset in response to every reboot made manual process difficult, availability of system depended on human resources, time consuming and not easily maintainable, handling unexpected exceptions, automatic rollbacks, and having to wait until next day to see the runs, if resources are not available.

That list of "cons," along with other elements were discovered with the manual implementation of version 1.0, directing to next steps. It also elicited a new list of questions including: 1) Developing a list of features to be automated 2) Cloud-based automated solution may be the preferred option 3) Reduce human dependencies 4) Ensure that the platform is highly available 5) Automation, manageability, high availability, scalability, cost effective 6) Not possible to reduce dependencies, which may make the solution to be focused on understanding data collection and distribution and build reliable integration to pull right data from source of truth (SOT) and be the most reliable source of distribution (SOD). By taking these lessons learned into consideration, and answering these questions, a solution may be envisioned and built that encompasses the qualities that sustainably support business.

The iHAT is a method, or in programming terms, a script, whose inputs may include the mid-split-capable devices and any set top boxes (STBs) that share a home network connection on an operator's mid-split-capable network. iHAT outputs may provide operators with results indicating which mid-split-capable devices have successfully switched over to mid-split and which may use remediation to do so. The iHAT proof of concept (PoC) has proven that the remediation associated with mid-split may work well for small tests with up to 1,000 devices. Performing iHAT test for a larger population (millions of devices) revealed challenges in three key areas (1)-(3):

Automation—Automation of iHAT, specifically input gathering and output distribution may be a step at the beginning and ending of such a test. Taking steps to ensure the accuracy of the deployment data, which may be constantly changing due to business as usual (BAU) activities, including device swaps, may prevent aborted iHAT tests attributable to incorrect device information. Minimizing the time between gathering inputs and executing iHAT may ensure integrity of the inputs and may be best accomplished via automated process.

Service Impact—the speed test application for iHAT testing is important, behaving as a catalyst for determining whether a mid-split based service is going to degrade other customer services, like video. But, using a speed test application in this manner may be service affecting because it may block a customer's use of their CM during speed testing, and therefore may be limited to maintenance window activities. Another example of an iHAT service affecting feature may be associated with rebooting a CM, when CM switchable diplexer is changed from standard-split to mid-split. Eliminating service affecting components from iHAT process, like the speed test application and reboots, may enable iHAT testing to coexist with customer use.

Application Dependencies—for many operators, RFC and RHM may translate to multiple application interactions. An ideal case may be that all the applications used to support iHAT are responsive, meaning they complete their function in a timely manner. When such case doesn't occur, iHAT may be forced to retry, perhaps multiple times, and ultimately abort a test when dependent application functions fail. For example, RHM may not return STB signal-to-noise (SNR) data necessary to perform a pass or fail decision on ACI susceptibility. Other examples of application dependencies may include the speed test application and the associated class of service (COS) change application to test at the higher mid-split service rate. Most standard-split COS rates support up to 35 Mbps, but to fully utilize a DOCSIS 3.1 upstream, a new COS supporting a much higher rate, like ~300 Mbps, may be available for use during iHAT testing. Hardening iHAT for scale operation may rely on a careful review of the function calls it makes, an assessment of their ability to fulfill their function in a timely manner, and a consolidation of functions wherever possible.

As it turns out, there was an opportunity to consolidate application dependencies of the iHAT process involving the assessment of ACI susceptibility. The original version of iHAT was successful in testing during worst-case conditions experienced on a home network, which were simultaneous occurrences of (1) fully utilized mid-split upstream and (2) ACI susceptible service, including a customer watching video. There were at least dependent functions 1-5 in the original version of iHAT that were performed to assess ACI susceptibility:

function 1: CM COS change to support higher mid-split rate function 2: Switchable diplexer state change from standard-split (e.g., low-split or sub-split for 5-42 MHz upstream band) to mid-split function 3: CM reset associated with both (1) and (2)

function 4: Speed testing application to simulate customer activity function 5: Telemetry polls to assess against pass and/or fail criteria Upstream carriers energized by an upstream speed test may be replaced with OFDMA upstream data profile (OUDP) burst signal. FIG. 5 shows an example of an OUDP test request and OUDP test response. Using OUDP bursts may be facilitated without COS changes of (1). And using OUDP bursts may also give greater flexibility than speed test applications for estimating ACI susceptibility. OUDP bursts may be quicker, managed via CMTS scheduling functions, and more benign because their total transmission power may be reduced appreciably using smaller bandwidth, for example 1.6 MHz. This change may set iHAT up for no longer being restricted to maintenance window activities, especially if other service affecting characteristics of iHAT, like reboots associated with switchable diplexer changes, may be also eliminated.

Figure 7:
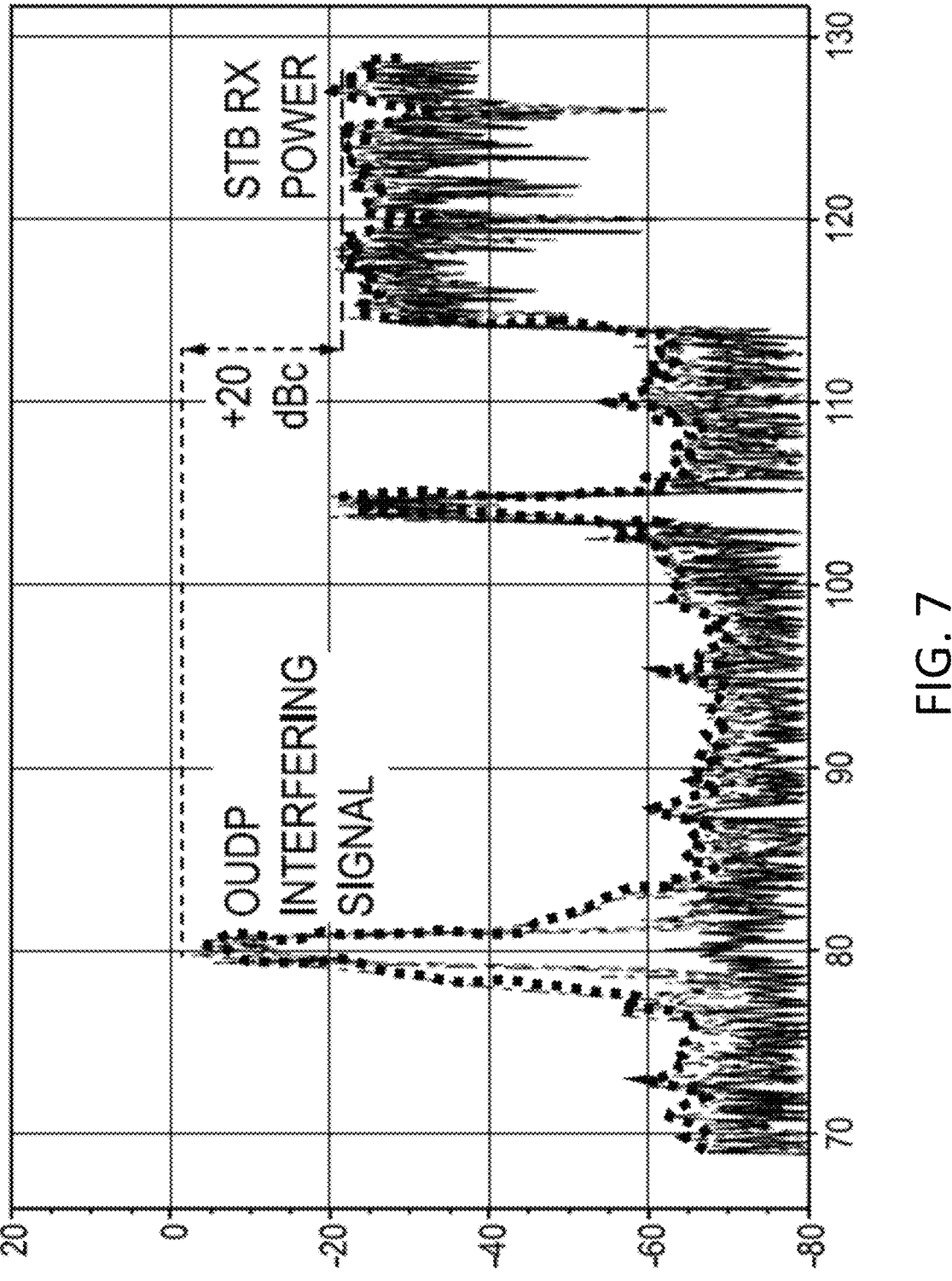
FIG. 7 shows an example of a spectral view of MS-CPE OUDP burst, SS-CPE out-of-band (OOB), and low frequency downstream signals.

With these changes, iHAT may produce a different view of the ACI susceptibility problem, which may become a spectrum-based view from the SS-CPE 320 point of view. FIG. 6 shows an example of simultaneous MS-CPE OUDP burst and SS-CPE SNMP data collection. While the OUDP signal is bursting as shown in FIG. 6, spectrum captures (e.g., SNMP collects) may be performed by the SS-CPE 320 at the highest rate possible, providing a multiple-sample spectral view of both the desired downstream signals and the upstream OUDP signal leakage into the SS-CPE 320, per FIG. 7. FIG. 7 shows an example of spectral view of MS-CPE OUDP burst, SS-CPE out-of-band (OOB), and low frequency downstream signals. From FIG. 7, ACI assessment may become more about visualizing OUDP signal leakage into the SS-CPE 320 receiver, than about driving the SS-CPE 320 into a failure state, like the original iHAT v1.0 using the upstream speed test application.

From this new spectrum view, two new parameters may be estimated: MS-CPE 310 to SS-CPE 320 (1) isolation, in decibel units (dB) and (2) interference level, in decibels relative carrier (dBc). When combined with the original metric collection, the isolation may be a calculation based upon the telemetry polling of the MS-CPE 310 transmit power in dBmV and the SS-CPE 320 receive power in dBmV. Equation 1 shows this relationship, based on decibels relative to one millivolt (dBmV) per 1.6 MHz channels.

$$\text{Isolation (dB)} = P_{MS-CPE\,OUDP\,TX} - P_{SS-CPE\,OUDP\,RX} \quad \text{Equation 1}$$

Adding SS-CPE 320 spectrum data to dependent function 5, "telemetry polls to assess against pass and/or fail criteria," as shown above and coordinating their capture to occur during the scheduled MS-CPE 310 OUDP burst transmission may enable the estimation of interference level in dBc. Interference level may be estimated via spectrum capture of the SS-CPE 320 per Equation 2. Multiple captures may be performed to ensure good estimates for both the OUDP burst and the downstream signal powers. Therefore, the power levels may be a statistical representation of multiple spectrum samples. In particular, the maximum hold, dotted trace of FIG. 7, of the available traces may be used to estimate channel power on a 1.6 MHz basis.

$$\text{Interference (dBc)} = \quad \text{Equation 2}$$
$$P_{SS-CPE\,OUDP\,RX}\left(\frac{dBmV}{1.6\,MHz}\right) - P_{SS-CPE\,DS\,RX}\left(\frac{dBmV}{1.6\,MHz}\right)$$

Figure 8:
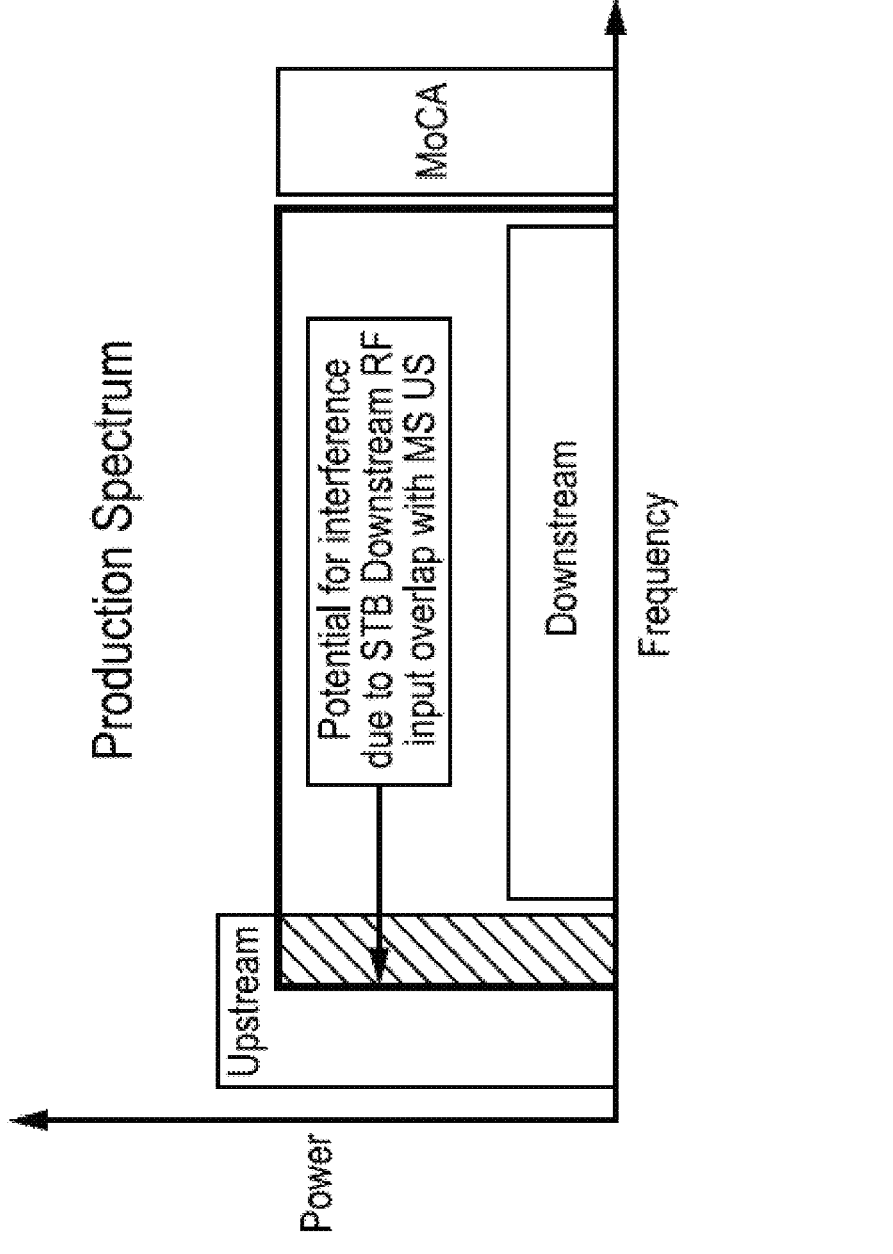
FIG. 8 shows an example of 30 MHz MS-CPE, SS-CPE receive window overlap.

Deciding pass or fail may be different than what was originally decided by the original iHAT v1.0 using the upstream speed test application, where failure assessments were made when SS-CPE 320 MER became worse than a threshold value of 28 dB, for example, a point past which degraded video would likely be observed for most STBs. New thresholds targets, like 25 dB for isolation and 20 dBc for interference levels, may be revised as data may be aggregated from multiple iHAT tests. Interference targets may be based upon laboratory and other investigations, where greater than 20 dBc interference power would result in a degraded MER and FEC metrics. In other words, the undesired OUDP leakage is 20 dB higher than the desired downstream power observed at the SS-CPE 320 input. This level of interference may put certain makes, models, and vintages of SS-CPE 320 at risk of failure due to ACI susceptibility issues, based on internal testing. Interference thresholds may also consider total power level differences of the OUDP signal (1.6 MHz) versus the overlapping mid-split power of OFDMA transmission in the SS-CPE 320 receive window, as shown in FIG. 8. FIG. 8 shows an example of 30 MHz MS-CPE, SS-CPE receive window overlap. Further, process accuracy may be proven over full range of SS-CPE 320 downstream receive and MS-CPE 310 upstream transmit power. The 25 dB isolation target may be based upon minimum output-port-to-output-port (OP2OP) isolation specified for passive components.

Another piece of scaling mid-split may involve configuration of the MS-CPE 310 switchable diplexer. The SNMP set approach may work for network utilization improvements and optimizing serving group capacity. Another way an operator may manage the MS-CPE 310's switchable diplexer may be using bootfiles. However, if there are no COS changes, redundant bootfiles may be deployed to have individualized control over a MS-CPE diplexer state. This may be challenging if there are many mid-split-capable platforms with many different COSs. For operators wanting to introduce a higher service tier, like within their commercial service markets, co-managing the diplexer state with the COS should coexist compatibly, and make more operational sense.

Figure 9:
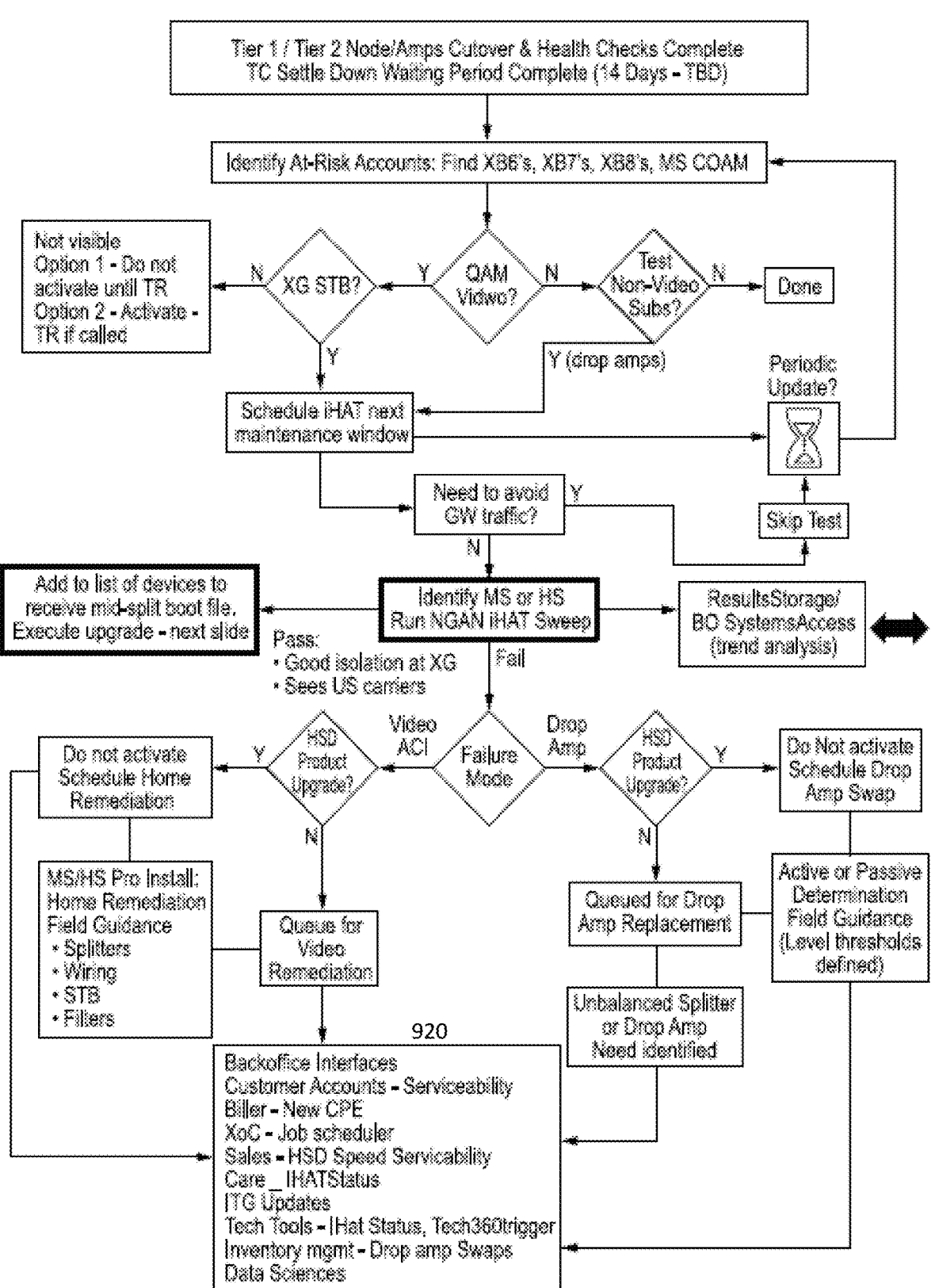
FIG. 9 shows an example of an in-home health assessment tool (iHAT) being the engine of a mid-split upstream spectrum launch (MUSL) framework.

A logical flow diagram for the overarching mid-split upstream spectrum launch (MUSL) ecosystem is shown in FIG. 9. FIG. 9 shows an example of iHAT being the engine of the mid-split upstream spectrum launch (MUSL) framework. As shown, within the MUSL framework, iHAT is the engine. Note that "Tier 1" and "Tier 2" are arbitrary labels meant to represent individualized operator upgrade strategies and show how these new processes may fit together.

The interfaces for iHAT for its use in production are the box 920 ("Backoffice Interfaces") at the bottom of FIG. 9 and briefly described below. These represent interfaces to consider for MUSL to distribute this information to stakeholders in the success of mid-split activation.

Customer accounts—serviceability: when there are new upstream speeds that mid-split may provide for systems to upgrade a customer, whether online or through a service call, the iHAT status of the home may verify that the upgrade may be done safely and meet a new upstream speed the customer expects. Alternatively, these tools may trigger an instant iHAT test for an updated result. An upstream or downstream speed, including a speed that may be associated with a particular split, may refer to a quantity of data divided by time (e.g., megabits per second, Mbps). A higher speed may correspond to a larger amount of bandwidth available for communicating data.

Biller—new CPE: When a customer changes CPE, possible iHAT variables that are affected may be the device's DOCSIS capabilities, the sensitivity to interference of a new video CPE, and the possibility of a wiring change in the home. It may be prudent, given these potential risks to the iHAT state as recorded, to test (or re-test) the home.

Operations—job scheduler: When a home "fails" iHAT, it may go into a remediation queue, with a flag for what needs to be remediated (video or HSD). This may allow Tech Ops to plan proactive remediations, occurring routinely and not waiting for a house call to take care of iHAT.

Sales—serviceability—Similar to customer accounts, sales representatives may be able to quickly assess whether a customer, such as an multi dwelling unit (MDU) property, is eligible for MS speeds by accessing iHAT status in existing sales tools Care—iHAT status, ITG updates: When a TC arrives at an agent, after some amount of ITG-led questioning, the possibility of the issue being MS-related may be considered. A check on the iHAT status of that home, or an instant iHAT test, may help the triage process.

Tech tools: When a tech is enroute or on site to a customer home, the tech may be aware of the MS status of the node and the iHAT status of the customer. Further in the tools, the sequence of steps to diagnose and fix a MS-related issue may also be available.

Inventory management—drop amp swaps: As remediations may be made at relatively large scale to remove old drop amps, procurement awareness to the deployment of alternative solutions may ensure that the supply pipeline is tracked and cared for.

Data sciences—As iHAT data is accumulated, new information about the home RF environment in dB performance, may trend over time, and correlations across neighborhoods may be stored and processed for future optimizations and to estimate future process implications and costs.

Figure 10:
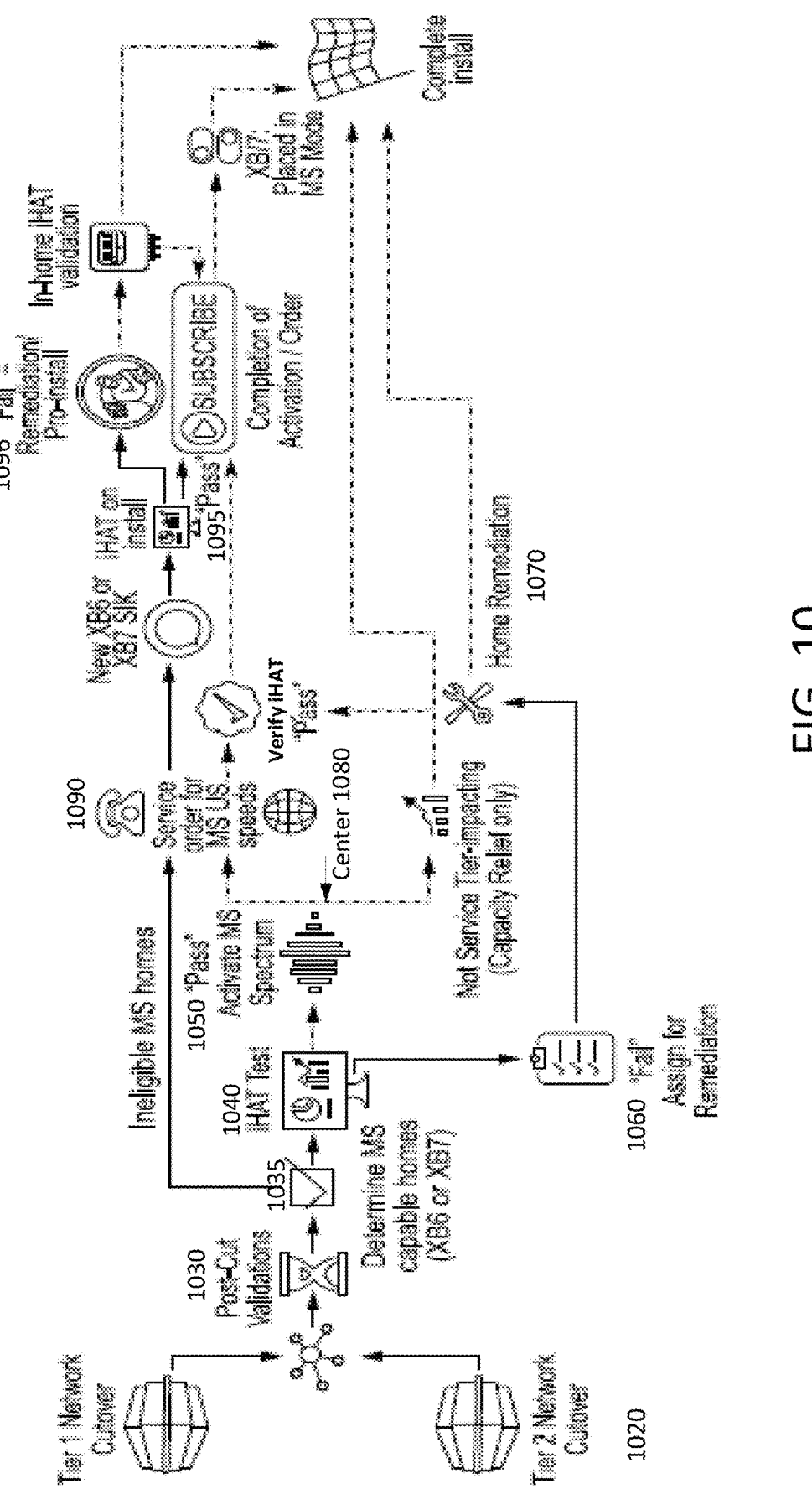
FIG. 10 shows an example of a simplified mid-split activation-cutover through to activation.

FIG. 10 shows an example of simplified mid-split activation method-cutover through to activation. For example, how iHAT 1040 may fit is shown within the broader perspective operationally, going from the trigger of a distributed access architecture (DAA) node cutover on the far left to the completion of activation on the far right. Beginning on the left, when a mid-split network upgrade occurs, the arbitrarily labeled "Tier 1" or "Tier 2" network cutovers 1020 may trigger internal tools, which may notify systems when construction is complete, and the cutover officially closed out. This may trigger the spectrum activation process. Two things may happen prior to letting iHAT sweep across the node to validate homes where mid-split may be turned on:

1) Post-cut validation 1030—Make sure that the network has settled to BAU metrics after the cutover. It is not uncommon to have a short period of elevated trouble calls shortly after a cutover, and it may be desirable to have any residual cutover issues resolved prior to moving to mid-split. This may be time-based, or it may be directly associated with trouble call metrics pre-cut vs post cut.

2) Determine which homes are eligible for activation— This may boil down to whether the DOCSIS CPE is capable of mid-split. For example, DOCSIS 3.1 Gateways may be mid-split capable.

On item 2) above, if a home is ineligible, iHAT 1040 may not be run. Following this arrow to the top path in FIG. 10, there may be no immediate step to get that customer a mid-split capable modem. There may be an effective loss of capacity for every CM that may not access the DOCSIS 3.1 spectrum, because it may force utilization in the Low-Split band, rather than access the more efficient OFDMA spectrum above 40 MHz.

There is guidance in the field on what may trigger a DOCSIS 3.1 upgrade for a customer—a particular speed tier for example. Over time, DOCSIS 3.0 CMs may organically disappear from the field. It may be at some point that a proactive effort may be taken to remove the stragglers still in the network to maximize the DOCSIS 3.1 capacity.

As shown in FIG. 10, if the customer decides to upgrade their speed tier to one that uses mid-split, getting the customer a gateway capable of that may be a priority. Also, of course, this customer's home may be evaluated for its ability to be placed in mid-split mode. So, as a new mid-split capable gateway may be brought onboard, one of the things it may do is call on iHAT 1040 and determine the state of the home for mid-split. If iHAT "PASS" 1050 is recorded, the activation process may continue, and iHAT 1040 may set the device into Mid-Split mode and it may become capable of using the OFDMA spectrum, in this case between approximately 40-85 MHz. If iHAT records a "FAIL" 1060, the customer may be notified that a technician may come to the home to complete their installation, and that their new speed tier may not be available until this "Pro Install" step happens. When the remediation 1060 is complete, the technician may validate onsite with iHAT 1040 that may be triggered locally from the performance health test (PHT) application.

If the eligibility conditions are in place—mid-split capable CM, and a STB model with the necessary telemetry capability—it may be moved to the left of the checkmark 1035 of FIG. 10: "iHAT Test" 1040 The lower path shows the case of "iHAT FAIL" 1060 ("Fail" Assign for Remediation).

As noted, unless there is a speed upgrade requested by a customer, there may be not necessarily an immediate need to provide the customer with a mid-split capable gateway. Yet the iHAT score may be logged, and the fact that the home wants to be remediated may be documented and populated into tools used by agents and technicians. Homes in this category may be placed into a remediation queue. iHAT 1040 may identify what the failure mode is so that technicians may remedy problems associated with the failure mode. In general, remediation tasks may involve changing out home amplifiers for alternative devices, checking the splitter configuration, model, and wiring to compliance. The iHAT 1040 test may be executed, for example, after the remediation tasks, to validate readiness for mid-split spectrum, and the activation may be completed.

When a home is scheduled for remediation, assuming there may be no speed tier ask requiring it, a decision may be made with a number of variables having to do with capacity, efficiency, and proactive expense. Ultimately, homes in the remediation queue may get serviced to extract the full DOCSIS 3.1 capacity and maximize the upstream runway. The method described in FIG. 10 may deliver such service.

Also note that a customer's iHAT "score" may not be necessarily static. Changes to the coaxial network in the home made by the customer, or new CPE brought into the home may both affect the iHAT score. These events are "On demand triggers" that may force iHAT 1040 to run off-cycle even after the initial iHAT sweep of the node at cutover.

The most straightforward flow in FIG. 10 may be the center, left to right. Both branches are logical and easily understood. An iHAT "PASS" 1050 may mean that the DOCSIS signals up to 85 MHz are received at virtual cable modem termination system (vCMTS) receiver, indicating that there may be no home amplifier or filter blocking this transmission. And it may mean that the home may have been checked for RF isolation between the CM and the STB and determined not to be at risk.

Going to the lower dotted line down the center 1080 of FIG. 10, this is the case where there may be no speed upgrade involved. The spectrum may be turned on to maximize efficient use of upstream capacity. The mid split plant upgrade plans, arbitrarily labeled as "Tier 1" and "Tier 2", may use this capacity to defer any future network augmentation by a number of years. So, while it may not be noticeably service impacting to a customer, it may be network impacting and indirectly service impacting by lowering the congestion on that node overall.

The upper dotted line above the center 1080 is the case when a speed tier upgrade request 1090 is made, and there may be already a mid-split capable device present. Because of the fact that an iHAT score may not be static, a new iHAT score may make sense to obtain prior to upgrading the customer. The customer expectations for the new service may be higher, and the awareness acute to service impacting issues, so it may be prudent to be certain that the home may be still in a "ready" condition. In addition, because the customer now may have, for example, a speed tier of 200 Mbps, they may have bursts of energy more likely to utilize a wide chunk of the mid-split band at once, a condition that more aggressively may expose the STB to energy that may cause video degradation. If this "updated" iHAT result is still "PASS" 1095 activation may be completed. If not (this is not shown), this home may revert to a Remediation state 1096, and because of the desire for a new service tier, it may be a Remediation Queue with a higher priority.

An overview of the innovative iHAT tool process flow is described above. What follows is a more detailed description of the automated software solution that was built for iHAT version 2.0. The new version of iHAT has been built for the devices that may exist on a distributed access architecture (DAA) platform. There are several characteristics of the software that have been prioritized when upgrading to version 2 from version 1.

A purpose of iHAT 1040 is to test whether a customer may successfully be switched to mid split without impacting their service. To do so, some service test may be initiated and compared to a baseline. Previously, in iHAT version 1, a speed test was run on the customer device. While this provided impressive results and proved to be a robust option, it left something to be desired in terms of efficiency.

A goal of iHAT 1040, and really any type of automated software that has the possibility of impacting the customer experience, is to lessen that impact as much as possible. To this end, iHAT version 2 has switched to a lightweight OUDP burst in lieu of the more heavy-handed speed test that version 1 relied upon. While running a speed test on customer hardware during peak hours may be out of the question, scheduling a short OUDP burst may be not. This may open the possibility of running iHAT 1040 tests outside of maintenance windows without impacting the customer experience. The current barrier to an unobtrusive experience may be a use for a device reset after the split type has changed on the gateway's diplexer—a limitation that may be lifted with a software upgrade.

To properly scale out software improvements that may cover the entire network footprint, agile software may be used. Network configurations and optimizations may be carried out in an ad-hoc method. While there may be a need for human decisions about solving problems, other problems may be solved by a logical automation.

Cable modem level data may be gathered by a data collection and device interface platform (e.g., Genome as described in FIG. 13) and used to regularly optimize the DOCSIS configurations of CMTSs. The features described herein may upgrade the network at a pace that may not be matched by cherry picking small parts of the network one at a time. Therefore, the system that facilitates such sweeping network changes may be able to operate in a seamless manner.

In the case of iHAT 1040, this automation comes at several stages. Version 1 had to manually run; this type of model may be tenable for a handful of node segments, accounts, and/or devices. In Version 2, node segments on the DAA may be automatically registered for the iHAT test pool when they become capable candidates based on network software and hardware criteria. Once a node segment is flagged as capable, automation may be set in motion to filter the CPE devices that are serviced by the node segment to those that are iHAT 1040 eligible and testing may commence. MUSL may periodically run iHAT 1040 as necessary based on network and account level changes.

Version 2 of iHAT 1040 may be built to be flat and scalable. Tests may run at a gateway device level, for example, leveraging Amazon Web Services (AWS) step functions and lambdas. This type of architecture may make the iHAT service scale as needed until it may encompass the entirety of the network footprint. A bottleneck may come from a DOCSIS limitation that may allow only one OUDP burst to be scheduled at a time on a remote DOCSIS physical layer (PHY) device (RPD) level basis. This may mean that the maximum number of gateways that may be run per RPD may be defined by the (maintenance window time) and/or (OUDP burst duration) with some padding on either end given for device resets.

The actual test may take a few seconds of gathering empirical data and a second or so of computing. The bulk of the time during any given maintenance window may be taken up by waiting for device resets, which may ideally be eliminated with hitless split changes sometime in the future.

Figure 11:
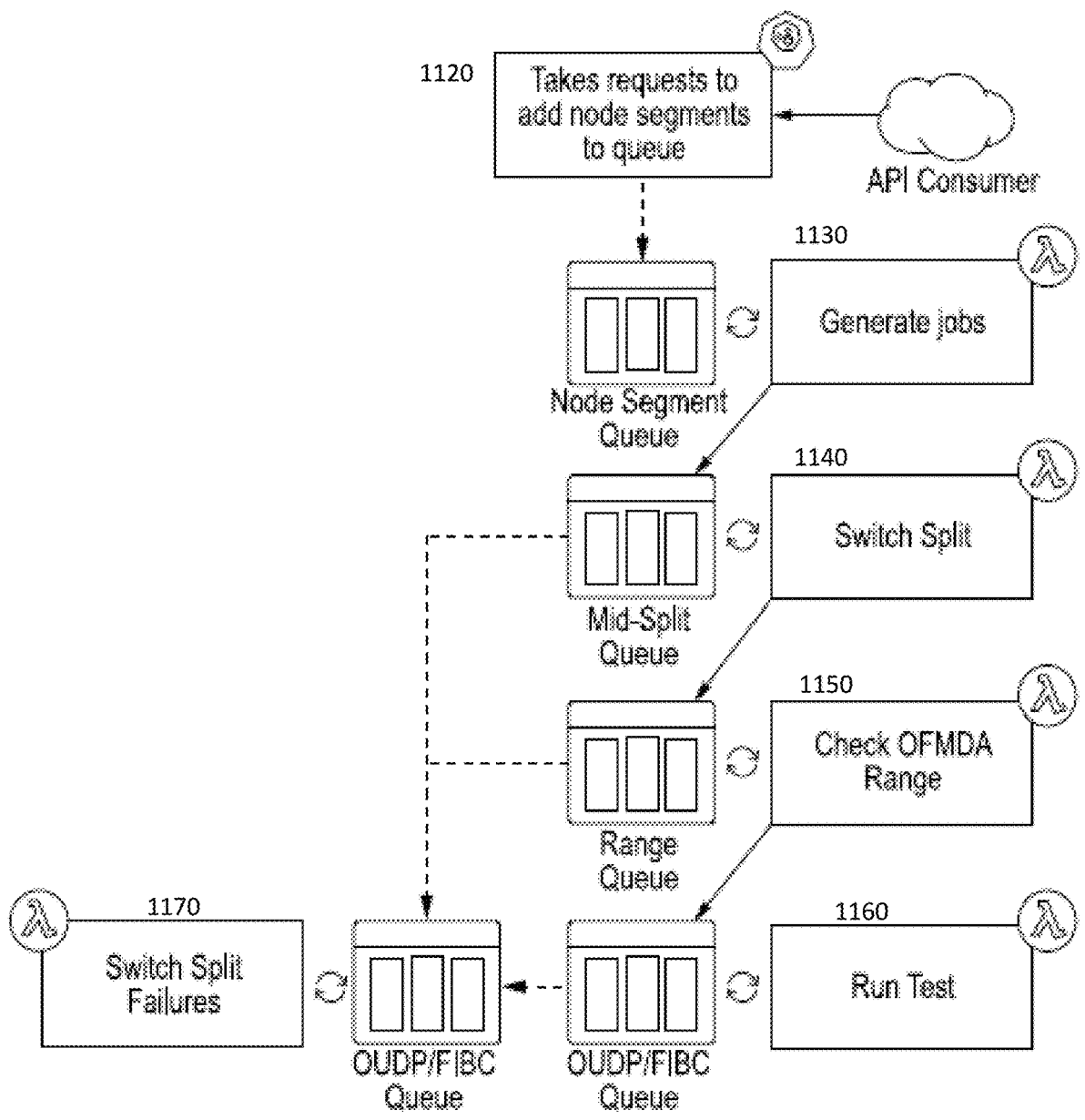
FIG. 11 shows an example of a high-level iHAT architecture.

FIG. 11 shows an example of high-level iHAT architecture. For example, a high-level architecture that iHATV2 employs to orchestrate mid-split testing at scale is shown. iHATV2 may run on one or more computing devices (e.g., application server 107). There are 6 distinct phases as shown in FIG. 11.

Phase 1 is the acceptance phase at step 1120. This is facilitated by having an application program interface (API) layer that may accept requests for node segment and/or RPD pairs to be added into the iHAT testing queue to be run in the next maintenance window. This API's purpose may be to provide an authentication and/or authorization abstraction layer that may wrap the node segment queue.

Phase 2 is the prep phase at step 1130. This phase may start with spinning up a lambda function ("generate jobs") using CloudWatch events at the beginning on a maintenance window. Two integrations may come into play in this phase. First, the federated data service (FDS) API is called with each node segment name. Node segment names may be swapped for MAC addresses that are grouped by service location. At this point, the MAC addresses are opaque, and the Genome may be queried for each MAC address to get device metadata. Genome may provide data such as the model number and current diplexer switch type. The starting switch type may be stored so that each device may be placed back in its original state in the case of inconclusive test results.

The model number may be used to classify device types and group devices on an account. Accounts may be further classified as mid-split eligible based on the kinds and configurations of the devices. Each eligible gateway on an account may generate one "device-level" job. Each device-level job may include one gateway and set-top-box devices on the account that may produce full band captures (FBCs). Jobs may be placed in the switch-split queue for further processing.

Phase 3 is the switch split phase at step 1140. The phase 3 lambda function ("switch split") at step 1140 may be responsible for making sure that modems are switched to mid split mode prior to data collection. If the gateway is already in mid-split mode, the lambda function at step 1140 may be responsible for moving the job from the switch-split queue to the range queue, so the cable modem may be immediately processed. If, however, the gateway is not in mid-split mode, the lambda function at step 1140 may be responsible for first calling Genome to initiate the switch-split into mid-split, and calling Genome again to initiate a modem reset. Once the modem reset has been initiated, the job may be moved from the switch-split queue into the range queue with a 2-minute message timer. This message timer may ensure that minimal resources are spent on waiting for the modem to reset. The rest and delay portion of this lambda function at step 1140 may still be applicable when iHAT switches to a hitless mode of operation.

Phase 4 is the ranging phase at step 1150. The modem may be in the correct state prior to iHAT data collection begins. The range queue that serves phase 4 may be the only queue that is not a first-in, first-out (FIFO) queue as it may house two different types of messages. The first type of message may represent cable modems that were already in mid split and did not need a modem reset. These messages may appear immediately in the queue as they have no message timer associated with them. The second type of message may represent those cable modems that may use a modem reset. These messages may appear after the 2-minute message timer has elapsed. Once a lambda function ("check OFDMA range") at step 1150 uses either type of message, it may poll Genome for a device online status. Once the device is online, the lambda function at step 1150 may confirm that the device may range on OFDMA. If the device fails to range, the modem may be sent to the cleanup queue, where it may be switched back into sub-split mode. This type of failure may be most likely due to blockage by a drop amp. If, however, everything looks good at the device, it's online and ranging, the job may be moved to the OUDP full band capture (FBC) queue with a message ID corresponding to the RPD that the customer gateway is connected to.

Figure 12:
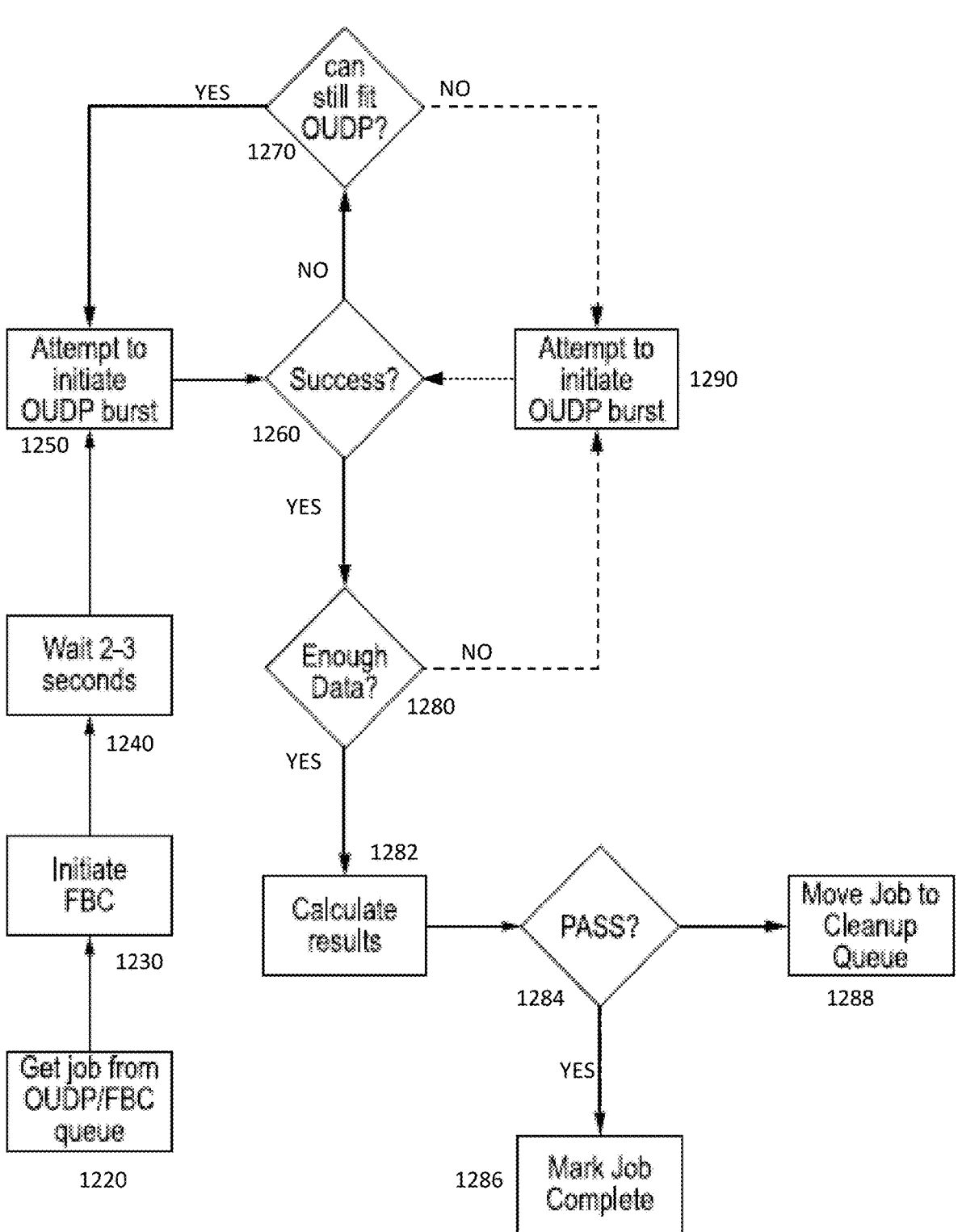
FIG. 12 shows an example of an OUDP full band capture (FBC) orchestration workflow.

Phase 5 may be where much of the iHAT test is performed at step 1160. A visualization of the workflow is shown in FIG. 12. FIG. 12 shows an example of OUDP FBC orchestration workflow. This phase may be slightly more involved than the rest of the phases because careful orchestration of the OUDP burst resource may be performed. As per the DOCSIS spec, only one OUDP burst on a certain frequency range may occur on a given RPD at one time. This may mean that one may be very careful when attempting to scale a process that heavily depends on the availability of the OUDP burst service.

The concurrency of this process may be controlled by using RPD names as message group IDs in the OUDP FBC queue at step 1220. In other queues that exist in the iHAT V2 workflow, the message group ID may be the unique value given by the job ID. Simple query service (SQS) may enforce that only one message from a given message group ID is used at a given time if the message batch is set to 1. This means that if jobs that are associated with a given RPD are associated with the same message group ID, the jobs may be executed in serial.

The maximum concurrency for the data collection process may be equal to the number of unique RPDs. Earlier iterations of the architecture tended towards forcing a concurrency equal to the number of unique RPDs in the maintenance window. A full range of scaling options may be available, as the iHAT workflow may rely on the availability and scale of other systems to function properly. Being able to calibrate scale may ensure successfully integrating with other systems.

The workflow may begin with a lambda firing from the SQS event trigger. First, genome is called to initiate FBC at step 1230 on each associated set top box in the job. This may take 2-3 seconds at step 1240 to initiate, so the lambda may sleep for 3 seconds prior to attempting to initiate the OUDP burst at step 1250 through the gateway. If the OUDP burst fails at step 1260, it may attempt up to 2-3 additional times at step 1270 depending on the FBC duration that was chosen. If it still fails at step 1270, or if the FBC process does not capture enough data at step 1280 for any of the set top boxes, the lambda may place the job at the end of the queue to be retried later at step 1290.

If the FBC and OUDP burst orchestration is a success, the iHAT calculation may commence at step 1282. This part of the code may take on the order of a second to complete. If the calculation yields a success at step 1284, the OUDP FBC job may be marked complete at step 1286, and the job has reached the end of the iHAT workflow. If the calculation yields a failure, the job may be moved to the cleanup queue at step 1288.

A purpose of Phase 6 may be to clean up failed jobs at step 1170. It may be used as the dead letter queue for queues except the node segment queue. It may also accept jobs from the phase 5 lambda function in the case that a successful test is run, but a failure may be noted by the telemetry indicating video service degradation. Categorized failures may include, but may be not limited to: failure of the device to switch split types, failure of the device to reset properly, failure of the device to range on OFDMA, failure of the OUDP burst to execute properly, and failure due to video noise. It is also possible that the iHAT workflow may fail due to underlying software issues, which may be due to network failures or failures of external systems to provide data.

There may be three outcomes of the iHAT workflow. Case 1 is the case where everything is favorable and the iHAT calculations yield a PASS. In this case, the customer gateway may be left in mid-split. Case 2 is the case where the iHAT calculations yield a clear FAIL. In this case, the customer gateway may be switched back to sub-split. Case 3 is the case where the iHAT workflow failed and may be inconclusive. In this case, the customer device may be switched back to its original setting that was recorded in phase 2, whether that is mid or sub-split. Case 2 and 3 may use manual remediation.

The workflow outlined above serves the BAU process of moving customer devices in bulk to mid split and routinely testing them in bulk to ensure network health. There may be, however, a separate use case for on-demand testing for customers with a technician in the home. Since the above workflow may use highly modularized components, serving this case may be trivial as the individual lambdas may be exposed via API and used by customer care tools. The current use cases may be for a technician to move a customer modem from mid to sub-split or vice versa and for an on-demand OUDP FBC data collection and calculation to yield a score.

The iHAT project may use several integrations with external systems. The one that is used most heavily may be the integration with the genome service. The iHAT tool may be much more complicated if it had to deal with authentication and SNMP, but the genome service may abstract those technical details away, allowing for a much cleaner and elegant solution. The followings describe in detail how the genome service achieves this level of abstraction at scale.

Figure 13:
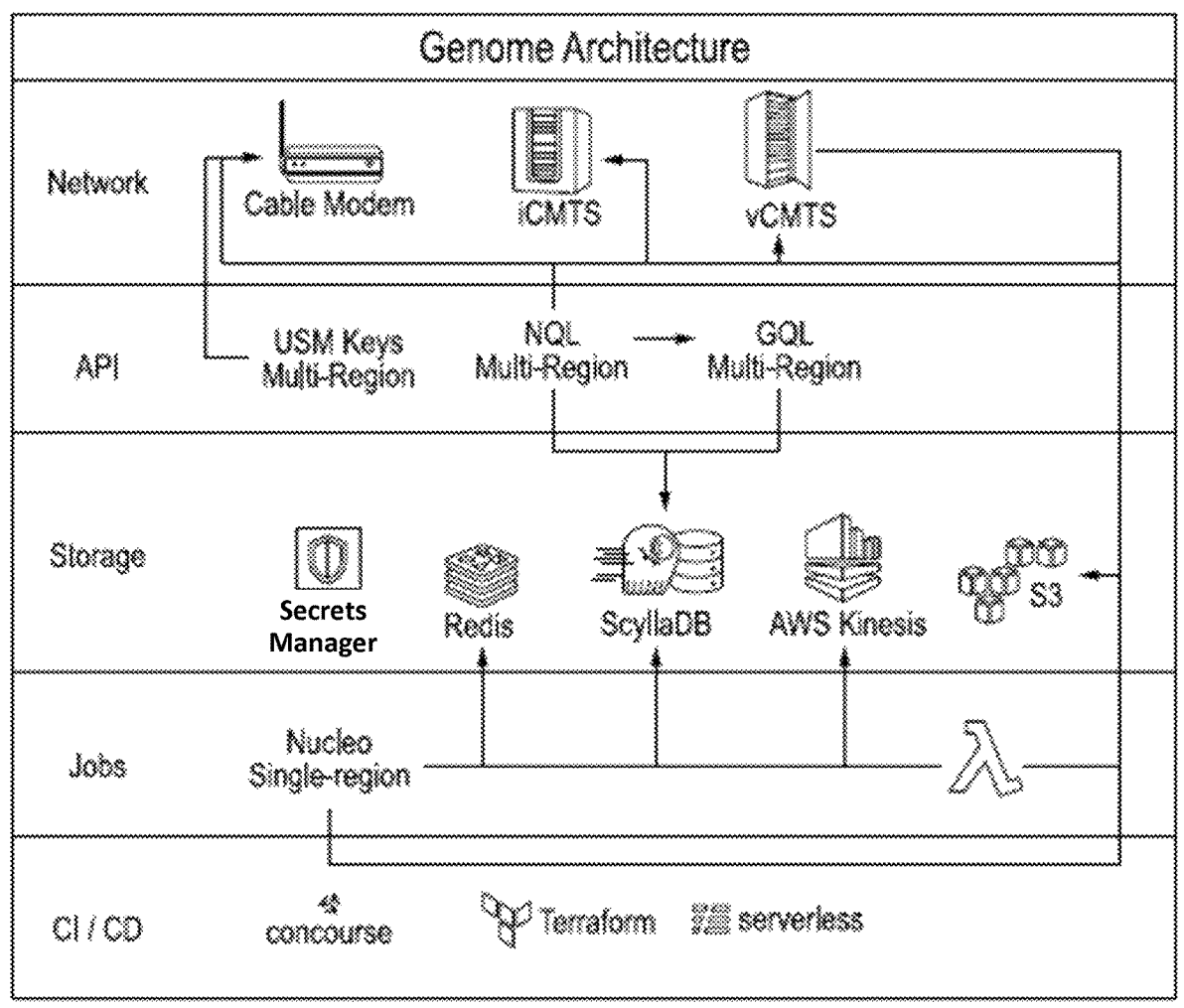
FIG. 13 shows an example of a data collection & device interface platform (Genome) architecture.

FIG. 13 shows an example of a data collection and device interface platform (referred to as "Genome" previously). A purpose of Genome is to actively poll and cache data from devices such as cable modems and CMTSs in a scalable and configurable way while offering users the ability to analyze the cached data and/or get live data in a seamless fashion (on-demand data polling). Genome may run on one or more computing devices (e.g., application server 107). This may place Genome to be a data provider, SNMP secure key collection, data validator and device interface layer for cable modem and CMTS data, eliminating inefficiencies around oversaturating CMTSs or cable modems with multiple connections and over fetching duplicative data. In the context of iHAT, Genome may be responsible for verification of eligible accounts and the devices that has been provided by business and their current status, running spectrum analysis while the OUDP has been triggered.

Genome may be made up of two layers, the poller layer, and the query layer. A "poller" may be simply a piece of software that may be responsible for scheduling, collecting, and standardizing a set of data from devices. Pollers may be built to be lean, modular, and extensible. A query layer for Genome is called network query language (NQL), which may expose a declarative API service through which users may request live or cached data. Pollers may be primary users of NQL to collect live data, while also offering external users to do the same. A goal of NQL is to offer a declarative abstraction layer for edge network devices, allowing users to query using standard hypertext transfer protocol secure (HTTPS) instead of SNMP, trivial file transfer protocol (TFTP), and various other network communication protocols.

Genome may use a list of eligible devices to poll the necessary data for iHAT. iHAT may work as the mediator between business system which holds the list of eligible nodes and/or accounts, verify the OFDMA being active, along with mid-split capability and eligibility, and feed Genome with this eligible device list to check the device status to make sure that they are in the right state to run iHAT. The polling may be done at any configured frequency or on-demand.

In addition, Genome may ensure that data collection may scale when devices are added over time such that data collection and aggregation may be achieved in a given polling window. It may also ensure that the ingested data is validated and cleaned prior to the ingested data being cached. As the amount of data may be large, especially in the case of cable modem data, Genome may also manage data retention policies in order to reduce cost.

Figure 14:
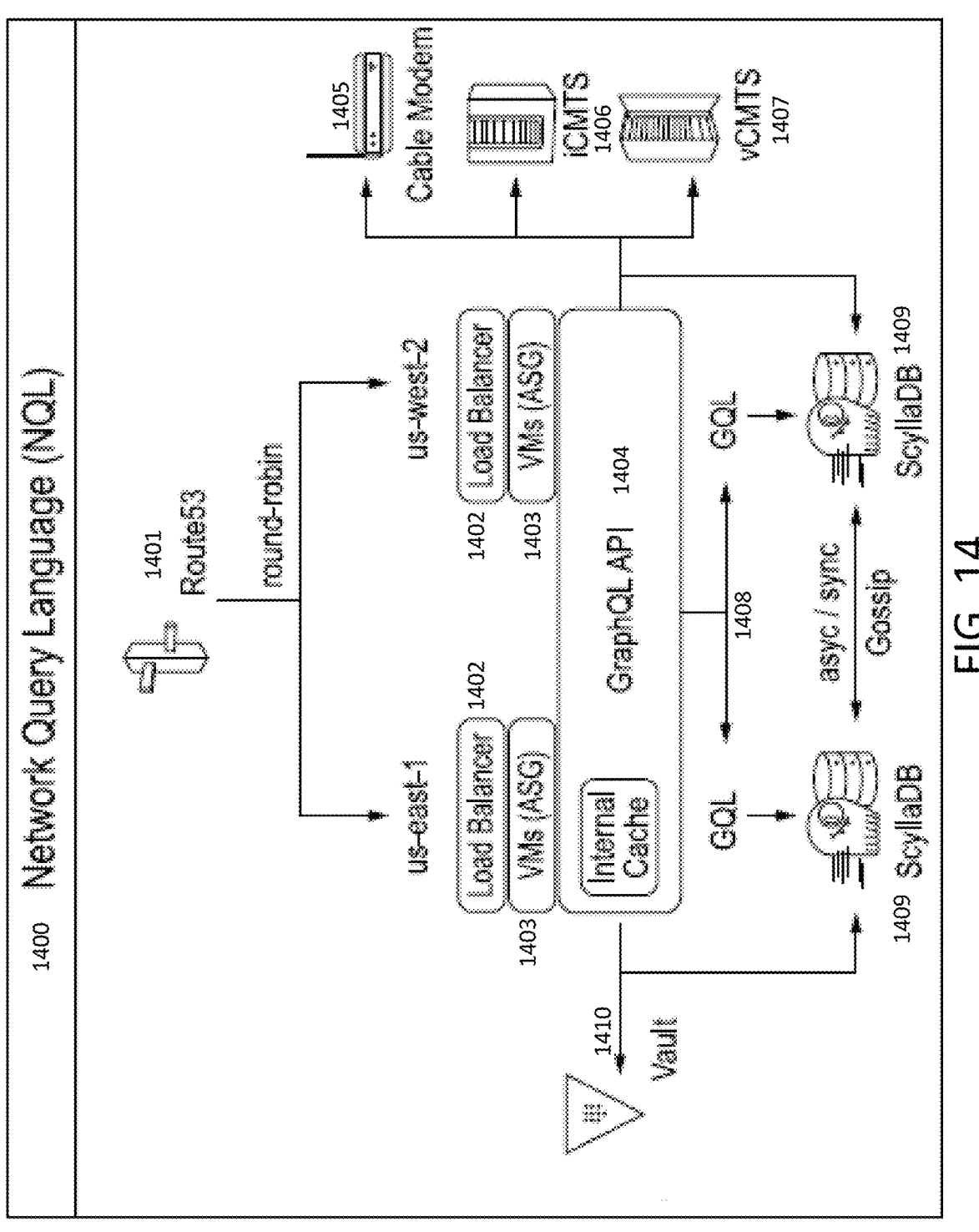
FIG. 14 shows an example of Genome application program interface (API)-network query language (NQL) architecture.

NQL may provide an API service which abstracts away different protocols around networking and lets end users interact through HTTPS. The first iteration of NQL came in the form of a representational state transfer (REST) API which accepted object identifier (OIDs) parameters and returned the output through HTTPS. While this iteration ran in production for several months, several shortcomings were brought to light (e.g., use cases involving data points per CMTS or CMs, necessitated making multiple requests to the API). Each request may connect to the CMTS, which resulted in opening and closing sockets multiple times over multiple requests. Furthermore, the work of encoding and decoding large amounts of javascript object notation (JSON) data was repeated for each request, degrading the overall performance of the service through repetition of work. Graph query language (GraphQL) was an option that allows data schemas to easily evolve and may handle complex relationships between data sets. FIG. 14 shows an example of Genome API-NQL architecture. That architecture may comprise a scalable domain name system web service 1401 (e.g., AWS Route53) that connects user requests to internet applications. The web service 1401 may connect to two load balancers 1402 in round-robin fashion. Each of the load balancers 1402 may interface with virtual machines (VMs) (e.g., Amazon web services (AWS) auto scaling group (ASG)) 1403 that interface with GraphQL API 1404. GraphQL API 1404 may have internal cache and may use graph query languages (GQLs) 1408 to query an open-source distributed data store, ScyllaDB 1409. ScyllaDB 1409 may be used by a video streaming service (e.g., Vault 1410), cable modem 1405, integrated CMTS (iCMTS) 1406, or vCMTS 1407 to store or retrieve data.

As NQL may offer an abstraction layer for connectivity to both cable modems and CMTSs, NQL may therefore manage writes as well as reads to each network device. In order to accomplish this, NQL may support both IPv4 and IPV6 communication protocols. NQL may be built primarily using the GraphQL specification and may be optimized at node level. In some cases, a user may make a request-response type handshake, where the user may keep a socket open until the requested data may be returned. However, multiple queries may be long running, and it may not be practical or possible for the user to keep a connection open for the duration of the process.

NQL's secure shell (SSH) feature may allow users to log into a supported remote device through HTTPS rather than SSH. This may allow NQL to abstract away details around authentication, authorization, and managing the underlying SSH connection. Users may be able to connect to a host, run multiple commands, and get output back for each command. NQL may use GraphQL to define the API, which may allow developers to develop features and evolve an API. NQL's SSH is a layer around SSH. The logic around what commands to run in what order and what to do with the output may be handled by the client itself. For example, configuration management may apply configurations to a CMTS and analyze the output to see if everything went well. This may be done through HTTPS using NQL. NQL has evolved from a standalone service running on an elastic compute cloud (EC2) virtual machine (VM) to where it may be leveraged anywhere within a codebase and able to run in any container or lambda alongside the codebase.

Figure 15:
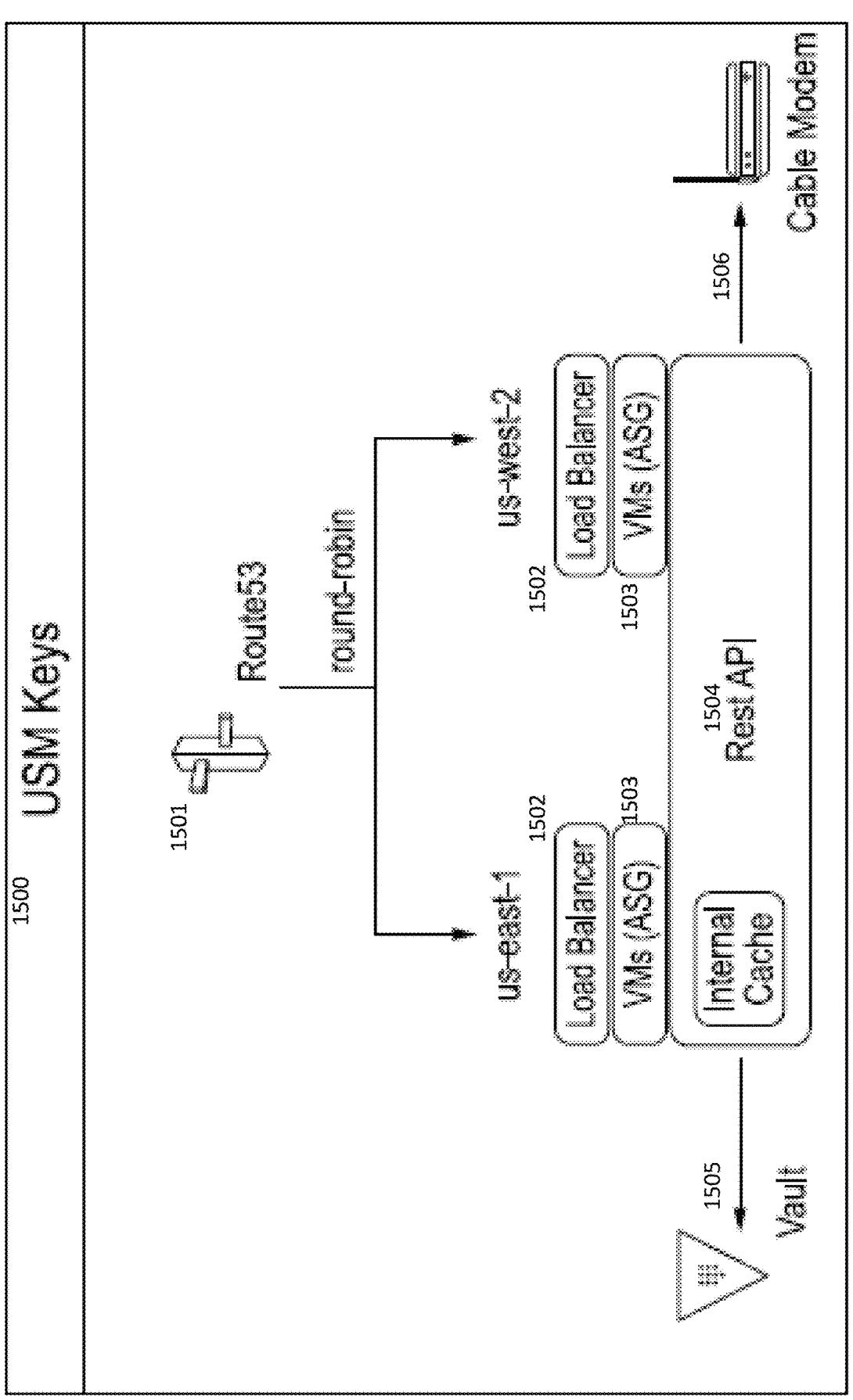
FIG. 15 shows an example of a simple network management protocol (SNMP) v3 user-based security model (USM) key architecture.

FIG. 15 shows an example of SNMP user-based security model (USM) key architecture. SNMP v2 and/or SNMP v3 capability and USM are shown in FIG. 15. USM keys 1500 may comprise a scalable domain name system web service 1501 (e.g., AWS Route53) that connects user requests to internet applications. The web service 1501 may connect to two load balancers 1502 in round-robin fashion. Each of the load balancers 1502 may interface with virtual machines (VMs) (e.g., Amazon web services (AWS) auto scaling group (ASG)) 1503 that interface with representation state transfer (Rest) API 1504. Rest API 1504 may have internal cache and may communicate with cable modem 1506 and/or a video streaming service (e.g., Vault 1505). Genome by default may use SNMP V3, and if the device is not V3 enabled, the fallback option may be V2. The roles of USM may include getting public and manager key from cable modem, using manager key and V3 security name as input to get vault secret, and using cryptographic hash function on vault secret and_public_key_and_compute_private_keys.

A detailed view of the iHAT software architecture covering Genome, NQL, and USM are described. With an understanding of the iHAT operation for mid-split, future enhancement considerations are discussed for expanding upstream path to high-split. Further, new functionalities may be considered for future generations of iHAT software.

Plant upgrades with mid-split may be just the beginning of extending the upstream spectrum and increasing the upstream throughput capability. Mid-split spectrum activation may add additional capacity in the upstream and extend the life of node splits. To achieve 1 Gbps symmetrical services, significantly more upstream spectrum may be used. High-split development and deployments are in process and FDX may be right around the corner to achieve one Gbps and greater symmetrical services.

OFDMA activation, node and amplifier upgrades, the shift of the downstream spectrum to allow room for the extended upstream spectrum, adjacent channel interference, plant design levels, CPE devices, in home amplifiers and splitting networks were evaluated and validated for mid-split deployments. The learnings from the development continue to be used for high split.

The process of splitting and upgrading a standard-split analog node to mid-split digital nodes may occur multiple times a day throughout networks. Provisioning and pushing of the downstream channel map, upstream channel configuration, and upgrading of plant equipment, nodes, and amplifiers may happen simultaneously and with minimal disruption to customers. This same process may be used for mid to high split upgrades. Mid split nodes amplifiers may be 1.2 GHz, so there's plenty of spectrum available to move the downstream spectrum above 258 MHz prior to high split equipment installation. Tools, like Comcast's Scout Monitoring, have been developed to monitor and validate physical layer parameters, including OFDMA in the upstream, and these have been extended to 204 MHz in the upstream. Examples of these tools are shown below. FIG. 16 and FIG. 17 show the upstream DOCSIS 3.0 and 3.1 channel status via Scout. FIG. 16 shows an example of mid split screen capture with 4 SC-QAMs and 1 OFDMA. FIG. 17 shows an example of high split screen capture with 4 SC-QAMs and 1 OFDMA.

Figure 18:
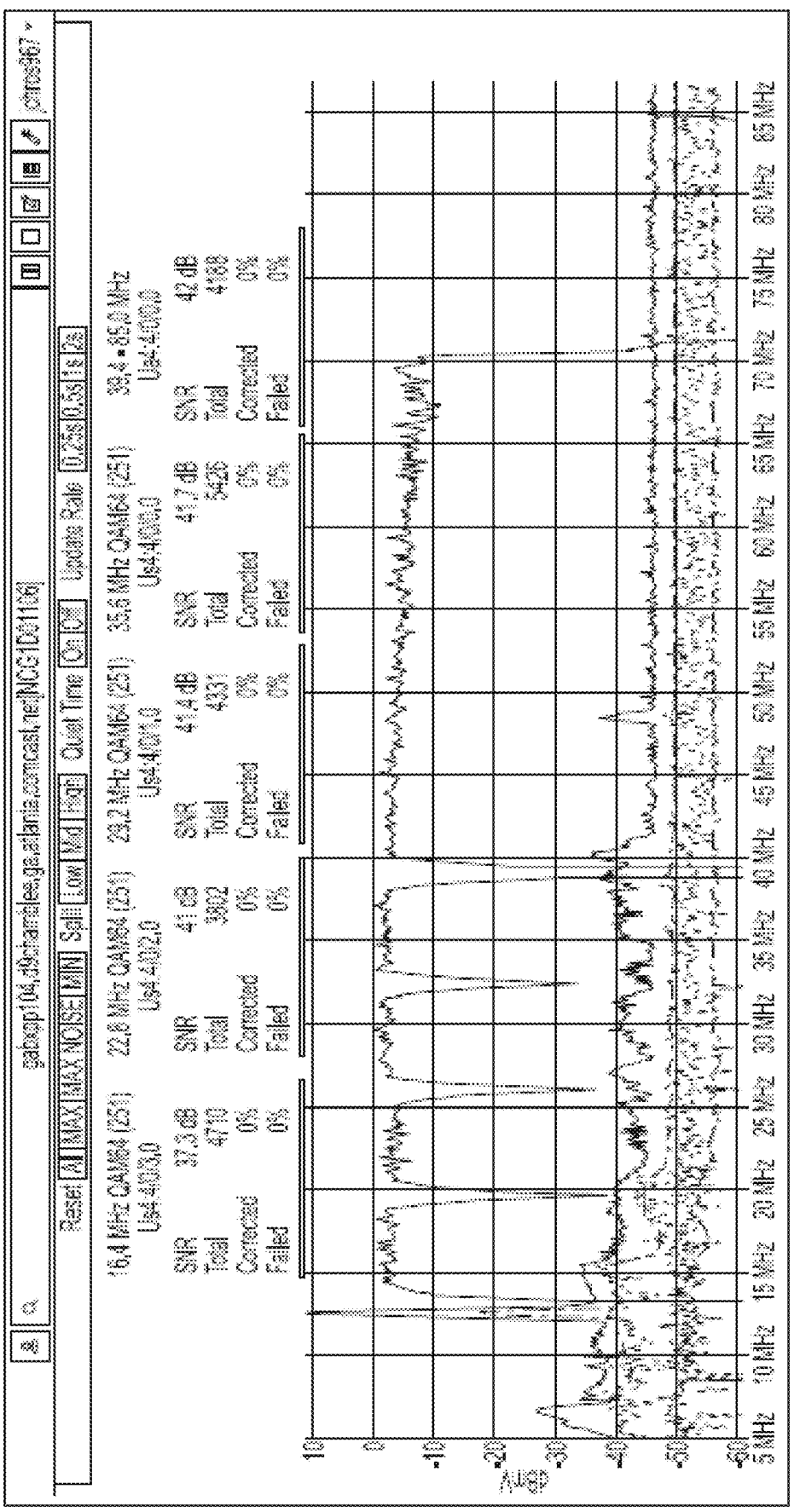
FIG. 18 shows an example of a high-split screen capture at remote DOCSIS physical layer (PHY) device (RPD) with 4 SC-QAMs and 1 OFDMA channels.
Figure 19:
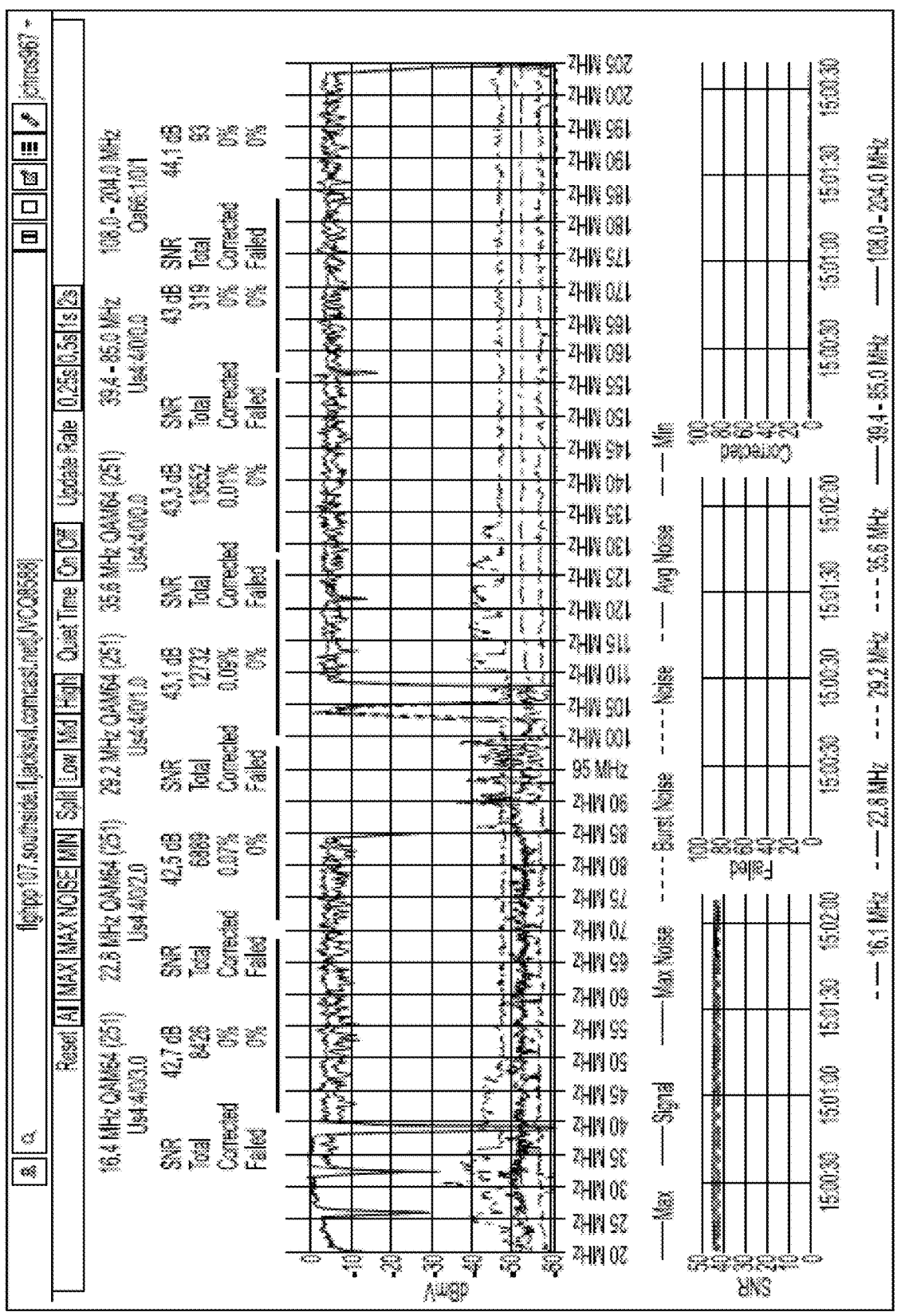
FIG. 19 shows an example of a high-split screen capture showing 2 OFDMA channels.

FIG. 18 and FIG. 19 show the upstream spectrum as received at the RPD via a real-time upstream spectrum analyzer tool for mid split systems to 85 MHz and high split systems to 204 MHz. FIG. 18 shows an example of mid split screen capture at RPD with 4 SC-QAMs and 1 OFDMA channels. FIG. 19 shows an example of high split screen capture showing 2 OFDMA channels. The real-time upstream spectrum analyzer tool may be used to evaluate the upstream channels and also the underlying upstream noise. Note that the lower spectrum edge starts at 20 MHz due to current fast Fourier transform (FFT) limitations.

ACI has been studied for mid-split plants. iHAT first started out exercising the full mid-split upstream band with a speed test and the adjacent in-home set-top box performance was monitored during the speed test. This was an effective way to measure the impact of the mid-split spectrum on the adjacent in-home set-top boxes. The speed test may interfere with customer high speed data usage and interference was possible on the set-top box, if the in-home isolation between the gateway and set-top box was inadequate.

During the development of high-split, a method of evaluating leakage was needed where the high split gateway in the home causes a leakage tone. DOCSIS 3.1 supports OUDP signals and APIs have been developed to have the vCMTS command a cable modem to cause an OUDP burst to be used for leakage detection. These same OUDP bursts are being used to evaluate adjacent channel interference. The OUDP burst is caused by the mid-split gateway and a simultaneous full-band capture may be taken on the adjacent in-home set-top box. Through testing, the thresholds for the set-top boxes for interference may be determined and the delta between the OUDP burst as measured on the adjacent set-top box and the downstream signal may be measured to evaluate the potential for ACI. If the delta is less than the threshold, the account may support mid-split spectrum activation. If the delta is more than the threshold, the account may be targeted for remediation.

Figure 20:
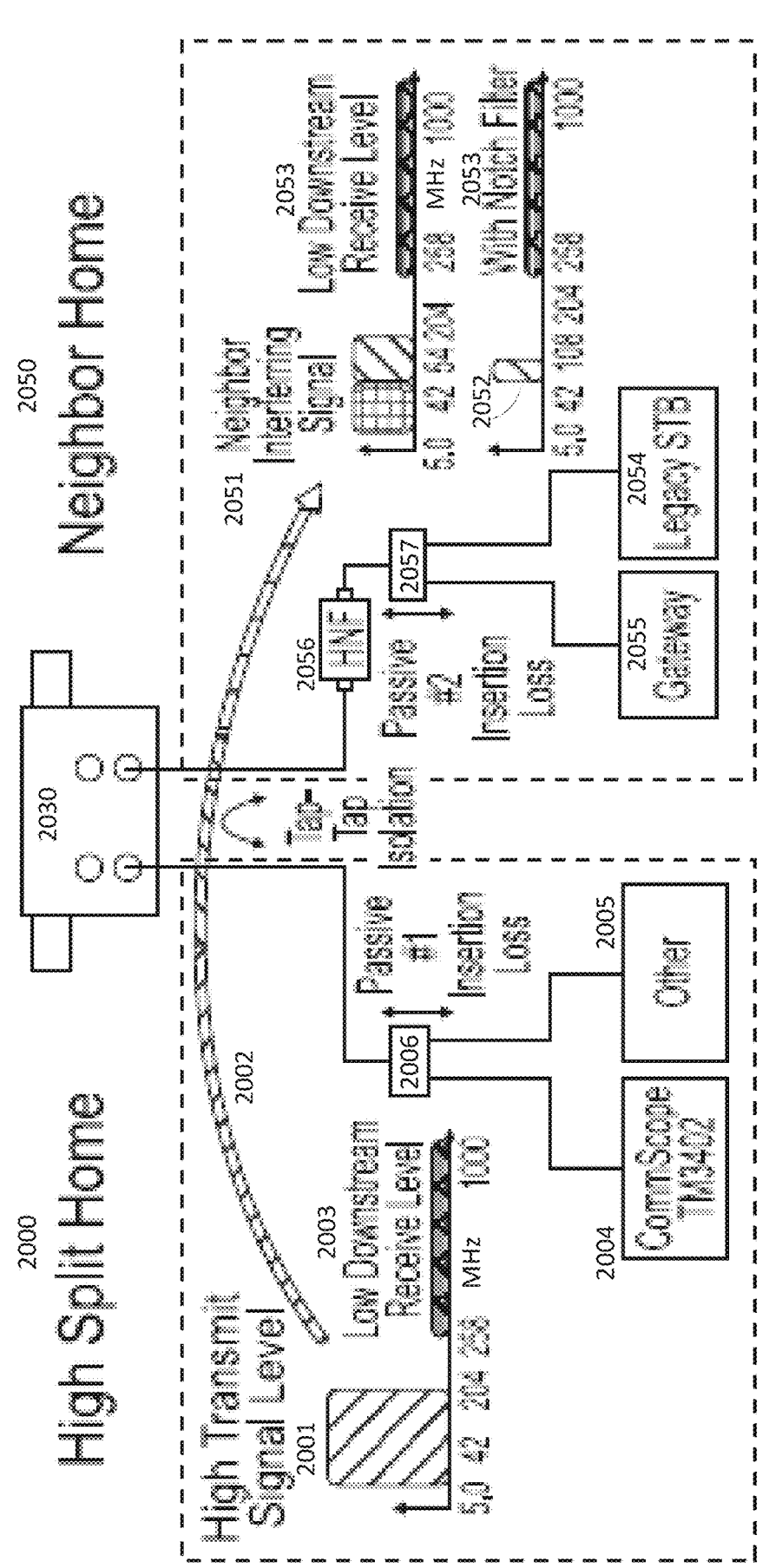
FIG. 20 shows an example of neighbor interference in a high-split system.

This same process may be used for high split systems to evaluate the potential for high split neighbor interference. In the mid-split plant, there may be enough tap-to-tap isolation and the interfering bandwidth may be smaller, so neighbor interference may not be a concern. In a high-split system, the extended upstream bandwidth coupled with lower tap-to-tap isolation with higher frequencies may cause the potential for neighbor interference. FIG. 20 shows an example of neighbor interference in a high-split system. High-split (HS) home 2000 and neighbor home 2050 may be separated by a tap-tap isolation 2030. HS home 2000 may communicate with a modem (e.g., CommScope TM3402 2004) and/or another device 2005 via a splitter 2006. The neighbor home 2000 may communicate with a gateway 2055 and/or legacy STB 2054 via a splitter 2057 and a notch filter (e.g., HNF 2056). HS home 2000 may have an upstream bandwidth of high transmit signal level 2001 for (e.g., 5 MHz-204 MHz) and a downstream bandwidth of low downstream receive level 2003 (e.g., 258 MHz-1000 MHz). The high transmit signal level 2001 of the HS home 2000 may partially overlap with a downstream bandwidth of the neighbor home 2050 and become neighbor interfering signal 2051 (see arrow 2002). The neighbor home 2050 may be able to suppress the neighbor interfering signal 2051 with the notch filter 2056 and have an un-interfered upstream bandwidth 2052 (e.g., 42 MHz-108 MHZ) and a downstream bandwidth of low downstream receive signal 2053 (e.g., 258 MHz-1000 MHz).

The same process the iHAT tool may use with the OUDP burst may be used to evaluate high-split neighbor interference. When high split modems are first deployed and prior to service being activated, iHAT may be used to cause the OUDP burst on the high split device and the neighboring standard and mid-split devices may be evaluated using the same full band capture method used for mid-split ACI. Additional system and plant information may be used to determine which devices may be connected to the same tap as the high split device and these devices may be monitored.

In a mid-split system, ACI and iHAT are focused on adjacent set-top boxes in the same home as the mid-split gateway or cable modem. In a high-split system, neighbor interference may occur both on neighboring set-top boxes and neighboring gateways and cable modems. As in the mid-split case, testing has been completed to understand the interference and threshold levels for high split interference both on the set-tops and gateways.

Figure 21:
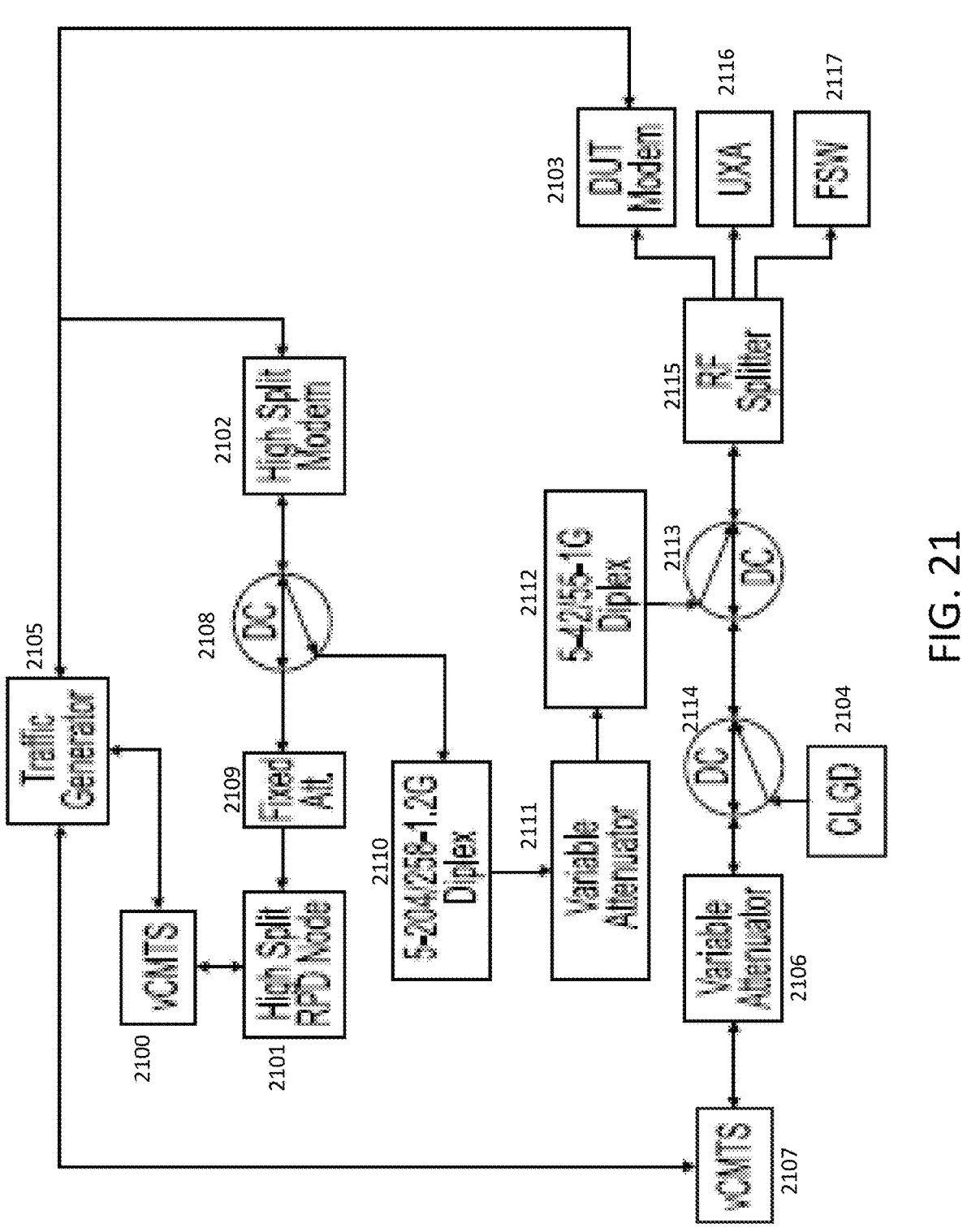
FIG. 21 shows an example of neighbor interference for Set-Top Box (STB) test configuration.

Testing was completed on both set-tops and gateways with a "Neighbor" high split cable modem passing traffic under various upstream throughput cases. FIG. 21 shows an example of neighbor interference for STB test configuration.

For neighbor video interference testing, data and/or video transmissions may be tested. For video a system may be connected to digital addressable controller (DAC) for the STB testing, and for data, the system may be connected to CMTS for CM testing. The same set-up may be used for testing both data and video (QAM) CPEs. A vCMTS 2100 is connected to a HS RPD node 2101 to generate the upstream load from a high-split (HS) modem 2102. The HS modem 2102 may communicate with the HS RPD node 2101 via a directional coupler (DC) (e.g., DC 2108) and fixed attenuator 2109. Alternatively or additionally, the HS modem 2102 may cause interference with a device under test (DUT) modem 2103, also measurable on a signal analyzer (e.g., UXA 2116), and/or spectrum analyzer (e.g., FWS 2117). The HS modem 2102 may cause interference with at least one of the DUT modem 2103, also measurable on a UXA 2116, or FSW 2117 via the DC 2108, a first diplex filter (e.g., 5-204/258-1.2G diplex 2110), a variable attenuator 2111, a second diplex filter (e.g., 5-42/55-1G diplex 2112), DC 2113, and RF splitter 2115. Alternatively or additionally, the DUT modem 2103 may communicate with vCMTS 2107, connected to a second RPD node (not shown) via the RF splitter 2115, DC 2113, DC 2114, and variable attenuator 2106. Alternatively or additionally, the DUT modem 2103 may have interference caused by a cable load generator (e.g., CLGD 2104) via the DC 2114, DC 2113, and the RF splitter 2115. The HS modem 2102 or the CLGD 2104 is configured for interference as follows:

4×6.4 MHz SC-QAM channels (for the SS CMs)

48 MHz OFDMA (up to 85 MHz, MS)

96 MHz OFDMA (108-204 MHz, HS)

Upstream (US) Traffic and Level adjusted to produce the desired interference signal A device under test (DUT) modems 2103 are configured as follows:

CM DS Load (258-1002 MHz)

OFDM (96 MHz, 792 to 888 MHz).

SC-QAM (603 to 789 MHz, symbol rate: 5.360537MSym/s, 256QAM)

SC-QAM above and below those frequency ranges from a type of video graphics array card, CLGD 2104.

Add noise to the downstream (DS) to decrease the received MER to 38 dB

A traffic generator 2105 is used to produce a fixed DS traffic for the DUT modem 2103 (300 Mbps data rate) while the HS data rate was varied from 1 to 980 Mbps STB DS load (258-1002 MHz)

The interference level may be defined as the ratio of the high-split interference power spectral density (PSD) (dBmV/6 MHz) with respect to the DUT downstream PSD (dBmV/6 MHz). The high-split interference ratio may take in consideration the occupied bandwidth for each high-split interfering traffic rate which may be CMTS scheduler dependent. The methodology for determining the high-split threshold interference was based on a measured DUT DS codeword error rate (CER) above a threshold of $1e^{-6}$ for data while an observer noticing video artifacts was used for video. The variable attenuator 2111 controlling the high-split interference level applied to the DUT modem 2103 may be adjusted for each particular interference high split traffic rate until the CER threshold is reached or video artifacts are observed.

FIG. 22 shows an example of cable-modem & set-top box interference: threshold vs neighboring high split throughput for several different models of set-tops. Testing interference low upstream throughputs correspond to low OFDMA utilization and/or a low duty cycle for the OFDMA channels occupying the band from 39.4-204 MHz. As upstream traffic rates are increased, the OFDMA channels may be utilized more and the duty cycle may be reduced, up until the point that the full spectrum from 39.4-204 MHz is being utilized 100% of the time. The threshold of interference under this testing shows that under a lower utilization, the interfering threshold is higher. For example, CM threshold interference is above 20 dB when HS US data rate is almost zero Mbps, as shown in FIG. 22. For example, STB interference threshold is also above 20 dB when CM US data rate is almost zero Mbps. As traffic increases, there may be a point where the interference threshold is decreased. For example, CM interference threshold drops below 20 dB when HS US data rate is increased to X (e.g., 63 Mbps) Mbps. For example, STB interference threshold drops below 20 dB when CM US data rate is increased to Y (e.g., 50 Mbps) Mbps. And as the traffic reaches its maximum, the upstream spectrum may be at a steady state and the interference threshold may rise. For example, CM interference threshold linearly rise as HS US data rate increases from X Mbps to 1000 Mbps. For example, STB interference threshold linearly rise as CM US data rate increases from Y Mbps to 1000 Mbps, as shown in FIG. 22.

A mathematical model has been developed to better understand the DUT front-end behavior and identify opportunities to improve the CM and/or STB performance. A goal is to capture the impact on the CM front end including front end overhead, automatic gain control (AGC) behavior, downstream and/or upstream power ratio, high-split upstream occupied bandwidth, and duty cycle.

Figure 23:
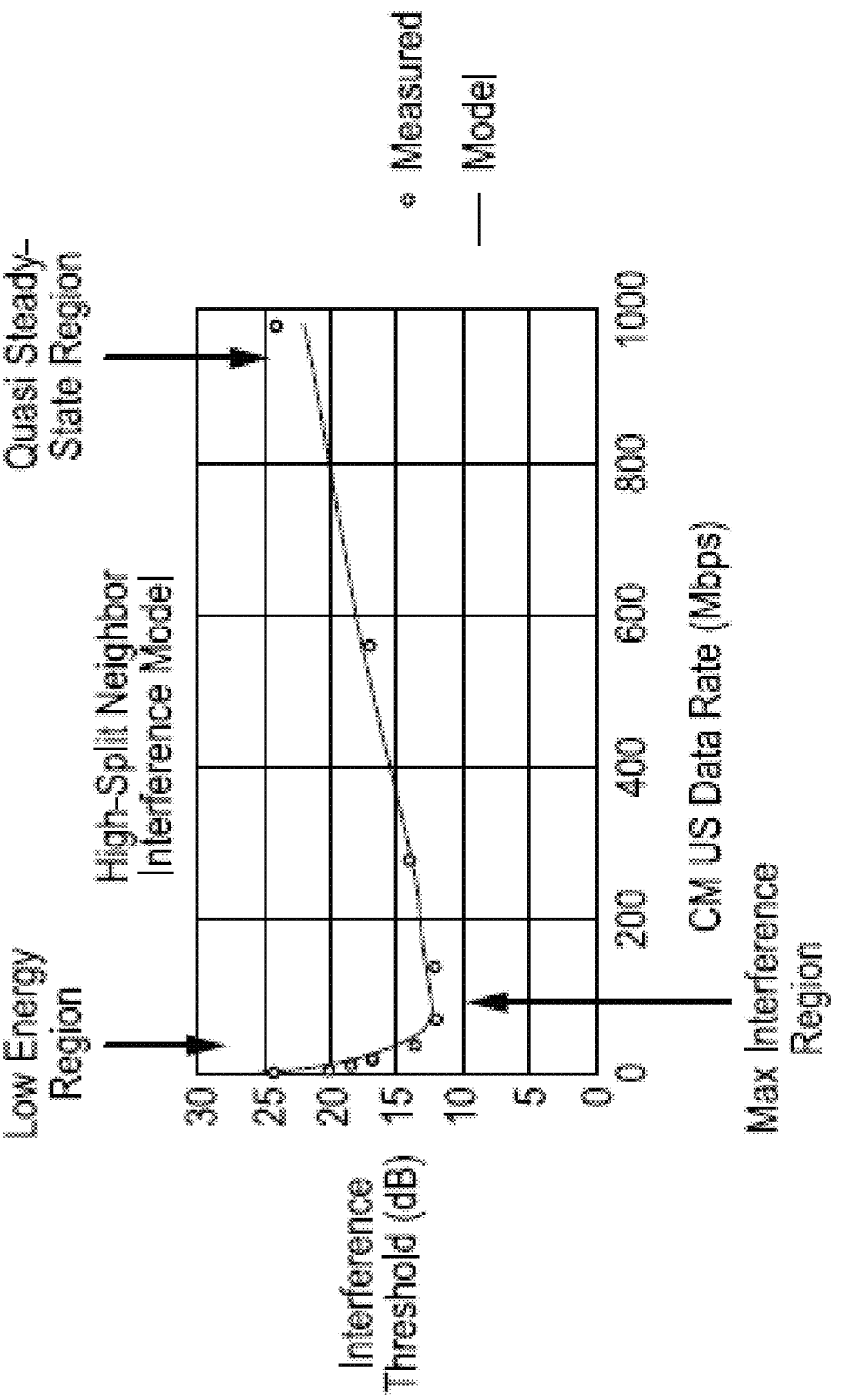
FIG. 23 shows an example of a high-split threshold vs neighboring high split throughput model.

FIG. 23 shows an example of high split threshold vs neighboring high split throughput model. For example, a comparison of the model with data measured is shown for a Comcast CM. It also shows the main regions of a typical CM or STB behavior:

Low Energy Region: range with low interfering signal utilization (occupied BW and duty cycle) (e.g., may take higher levels of interference signal to impact the victim CM front end).

Maximum Interference Region: range where the increased occupied BW and duty cycle produces the highest levels of interference and corresponds to minimum interference thresholds.

Quasi Steady-State Region: range where the high interfering signal utilization gets close to a continuous mode requiring higher levels of interference signal to impact the DUT CM front end.

The maximum interference frequency range may be dependent of the CM front-end and CMTS scheduler characteristics. In the case of the CMTS scheduler, grant allocation implementation, which translates into a certain upstream occupied bandwidth and duty cycle, defines the interaction with the CPE front end.

Additionally, for system design purposes, the minimum threshold level may be used since the upstream data demand may fluctuate. For example, Comcast measurements have indicated a minimum threshold levels in the order of 12 dB which may be better than the "Maximum average power of carrier input to CM, within any 6 MHz channel from 54 MHz up to 1002 MHz" and "256-QAM Image Rejection Performance" PHYv3.0 DOCSIS specs, which may limit the interference level to 10 dB. New cases may be developed and proposed to the CPE chip-set manufacturers to further improve the CPE performance, particularly as the industry may start to get ready for FDX. But tools like iHAT may ensure a smoother transition.

Figure 24:
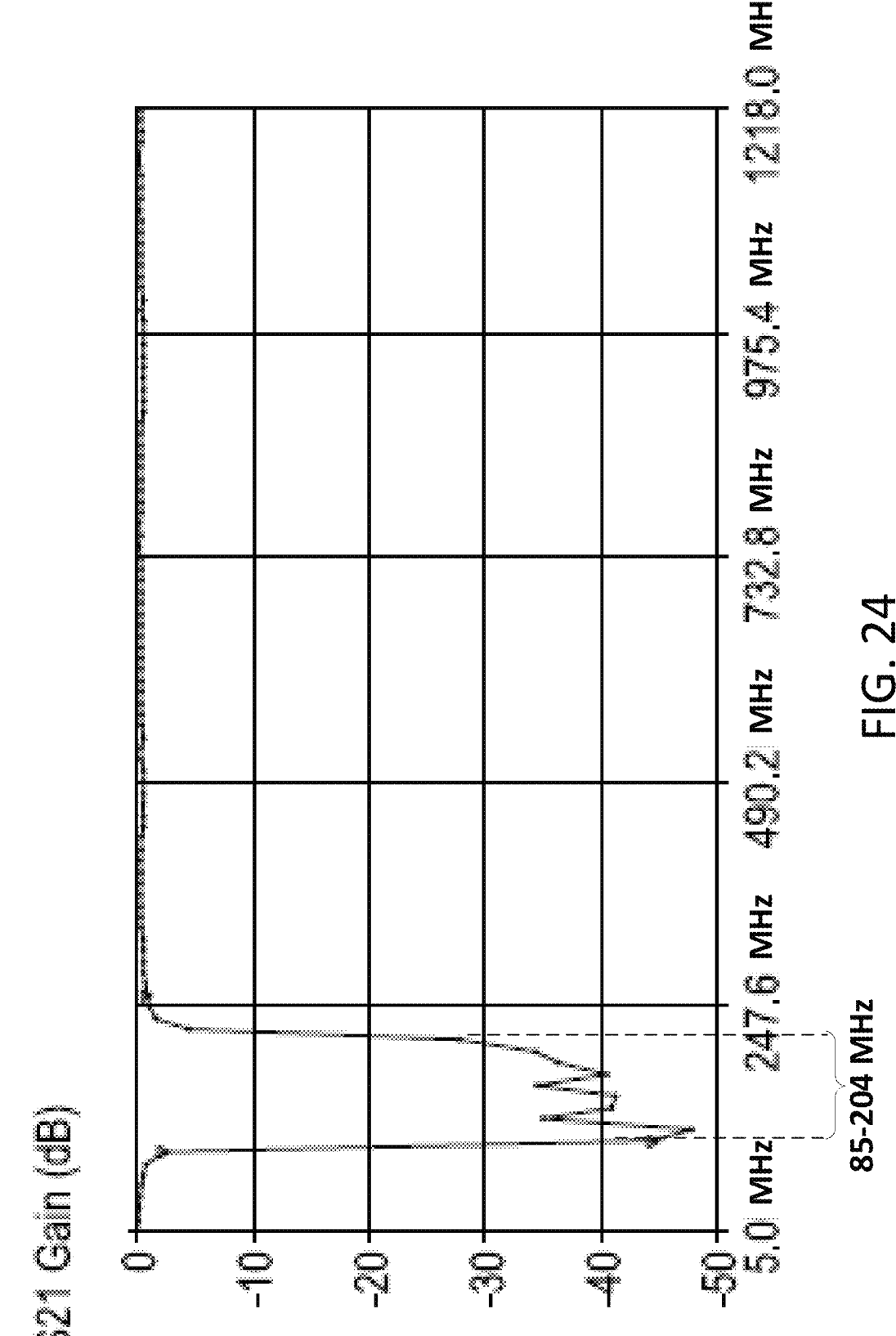
FIG. 24 shows an example of a neighbor interference notch filter 85-204 MHz.

If high OUDP signal to downstream levels are measured and potential neighbor interference is identified, several remediation methods may be implemented. One of the potential solutions may be the use of notch filters that may be added to neighbor drops and suppress the interfering signal. FIG. 24 shows an example of neighbor interference notch filter 85-204 MHz. Although not operationally desirable, these filters may be designed to notch out the complete spectrum from 54 to 204 MHz or to be compatible with mid-split systems, notch filters have also been designed and tested to pass up to 85 MHz and notch the spectrum between 85 and 204 MHz, as shown in FIG. 24 with curly bracket. For example, a frequency response of a notch filter may be used to prevent the impact of the high-split neighbor interference. Filter suppression higher than 20 dB may suffice for most cases.

This may allow mid-split and high split devices to co-exist and minimizes device types deployed in the field. New tap plates may also be installed. Newer taps may be specified with better tap to tap port isolation to help minimize neighbor interference.

With minor updates to the existing iHAT tools for ACI, iHAT may be adapted to solve the high-split neighbor interference. The threshold of the OUDP to downstream signal may be adjusted to match the measured interference levels for high-split interference, and the back-office tools modified to run and/or measure OUDP on different accounts. The frequency of the OUDP burst and duration may be optimized for certain areas of the band based on the isolation measurements and the duration may also be optimized. iHAT and OUDP measurements may be an ideal tool to validate the high-split system prior to activation to optimize the customer experience.

Improvements upon the process of evaluating ACI using spectrum-based methods have been made that would enable OUPD leakage detection to occur in a non-service affecting manner, harmoniously with regularly scheduled traffic. For scaling iHAT, the goal is to focus on making this tool work as quickly as possible, while offering robustness of carrier grade software at scale. A well-defined object model acting as the glue between iHAT process and downstream APIs may lead to the scale operations. The features described herein may provide iHAT with a basis to grow into a toolset that may make it easier for operators to operationalize 1 Gbps upstream speeds. These steps in upstream evolution may embrace new DOCSIS 4.0 FDX sounding technology, and work to harmonize new technologies while maintaining support for legacy service.

OFDMA-partial service (e.g., "OFDMA-partial" state) or OFDMA-blocked (e.g., "OFDMA-blocked" state), during or after mid-split spectrum upgrade on a particular node, plant, and/or RPD (e.g., mid-split upstream spectrum has been activated and/or updated to have 4 SC-QAM and 1 OFDMA channel), may be caused by a common plant issue or individual account and/or home issues. Identifying and/or troubleshooting causes (e.g., plant problems or specific in-home issues, etc.) of the OFDMA-partial service or blocked may be automated.

For example, during the mid-split spectrum upgrade, an upstream spectrum of an RPD in the plant may be updated to use 4 SC-QAMs on a standardized frequency plan with an additional OFDMA channel from 39.4-85 MHz. But, other devices (e.g., in-home drop amplifiers, line amplifiers, in-line equalizers, undocumented devices, etc.) in the plant may have frequency specific characteristics that were designed for sub-split plants with a 5-42 MHz upstream frequency spectrum and may cause OFDMA-blocked or OFDMA-partial service. For example, in-home drop amplifiers, if not upgraded to accommodate the mid-split 5-85 MHz spectrum, may cause blocking access to the mid-split OFDMA spectrum and/or channel. For example, line amplifiers, in-line equalizers, or undocumented devices, if not updated or misconfigured during the mid-split spectrum upgrade, may also cause blocking access to the mid-split OFDMA spectrum and/or channel. Consequently, for example, expected upstream speeds of 100 Mbps and 200 Mbps of upgraded devices may not be achieved if access to the mid-split OFDMA spectrum and/or channel is blocked.

Figure 26:
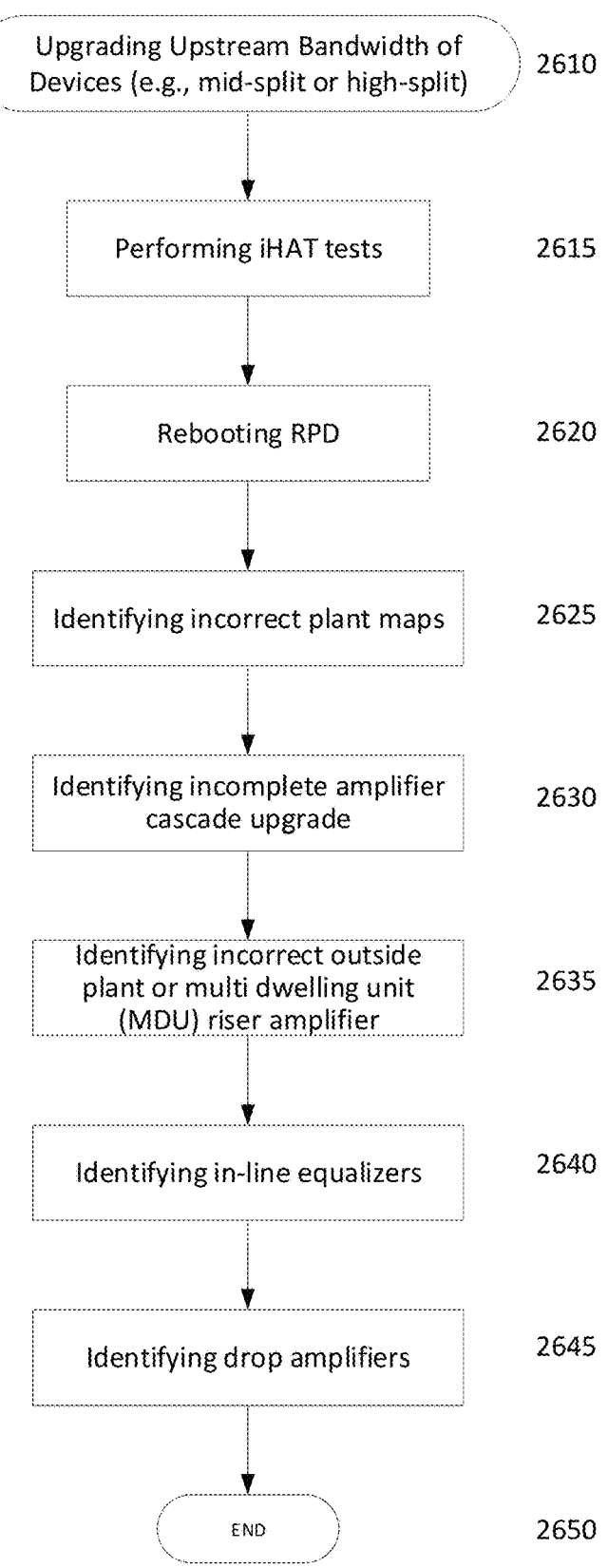
FIG. 26 shows an example of a flow chart showing steps for an example troubleshooting method for OFDMA-partial service or OFDMA-blocked.

FIG. 26 shows an example of a flow chart showing steps for an example method for troubleshooting OFDMA-partial service or OFDMA-blocked. One, some, or all steps of the example method of FIG. 26, or portions thereof, may be performed by one or more computing devices (e.g., application server 107). One, some, or all steps of the example method of FIG. 26 may be omitted, performed in other orders, and/or otherwise modified, and/or one or more additional steps may be added. To correctly identify root cause(s) of the OFDMA-partial service or OFDMA-blocked, the method may be automated in hierarchical order to rule out lower-level issues initially (e.g., RPD reboots) first and to check for and/or rule out higher-level issues (e.g., drop amplifiers) after ruling out the lower-level issues. Performing the steps of the method in the hierarchical order may contribute more effective and/or efficient planning of triage and allocation of resources for remediation (e.g., dispatching, based on the triage, appropriate technicians with correct skills for maintenance and/or corrections).

At step 2610, devices may be upgraded for more upstream bandwidths (e.g., mid-split or high-split). At step 2615, an iHAT test may be performed on the devices and may detect OFDMA-partial service or OFDMA-blocked issues. At step 2620, devices with OFDMA-partial service or OFDMA-blocked issues may be rebooted. A reboot may be appropriate for an RPD with 100% mid split capable devices that are in OFDMA-partial service, where some or all those devices are directly fed from a node. A fiber deep (also known as, Node+0) RPD, with all its ports used for feeder legs, may be a good candidate for a reboot since this condition may suggest that the RPD is somehow blocking OFDMA access. The fiber deep node+0 means that there is no need for an amplifier between the node and a subscriber because fiber line is pushed closer to the subscriber. In contrast, plant T1 (Node+2), and plant T2 (Node+6) may have amplifier cascades between such node and a subscriber, and thus may be less likely candidates for a reboot, but still better to rule out before dispatching maintenance personnel. For the aforementioned cases, potential RPD firmware bugs may be ruled out as a cause of an RPD not supporting a new OFDMA interface configuration. After rebooting, the iHAT test may rerun. If OFDMA-partial service or OFDMA-blocked issues are still present, at step 2625, incorrect plant maps may be identified.

At step 2625, devices may be represented on a diagram (e.g., plant map) that is used to show plots of land, properties, property boundaries, easements, nearby streets, or flood zones in a county, city, or neighborhood. The plant map may visually indicate that devices on different nodes are incorrectly mapped, for example, when a plant T2 upgrade superseded a documented Fiber Deep upgrade and all devices associated with a given node appear to be on multiple nodes per the plant topology overlay in the plant map. Incorrect plant map issues may be identified before diagnosing any part of the network that may require understanding of the network topology.

At step 2630, an incomplete amplifier cascade upgrade may be identified. A Tier 2 node may have many (100s) of connected devices and may also report 12 dBmV receive power per upstream SC-QAM signal and may be the focus of diagnosing cascaded amplifier issues. If cascaded amplifiers have not been upgraded to mid-split band, then most of modems downstream from amplifiers may become either "OFDMA-Partial" state after the mid-split band configuration has been pushed to the RPD or "OFDMA-Blocked" state after iHAT has been run. Corrections may be made after a mid-split band configuration is pushed. If iHAT has run, then iHAT may require a re-run after corrective actions are completed, otherwise modems may remain in an "OFDMA-Blocked" state.

At step 2635, incorrect outside plant or MDU riser amplifiers may be identified. When many devices (e.g., 20%-90% of all devices) off of an RPD do not connect to OFDMA channel, there may be incorrect amplifiers. Such incorrect amplifiers may be a riser amplifier in the outside plant or within the MDU. Instead of entire cascaded amplifiers, a single riser amplifier may be blocking OFDMA channel access, which may be why the percentages may be substantially lower. Such riser amplifiers may have a common pattern where devices fed by the riser amplifiers may only report "OFDMA-Partial" state or "OFDMA-Blocked" state.

At step 2640, in-line equalizers may be identified. In-line equalizers may be used to compensate for excessive up-tilt. The in-line equalizers may precede an adjacent tap. The in-line equalizers may be used once per feeder leg, toward the end of a long run of feeder, greater than 600'. The effect of the in-line equalizers on OFDMA signal may be different from an amplifier. An in-line equalizer may be a passive device with a pair of sub-split diplex filters to separate the forward and return paths. So, the amplifier may block the entire OFDMA signal but the in-line equalizers may block only a subset of OFDMA subcarriers (e.g., between 42 MHz and 54 MHz, which is the sub-split diplexer transition band). It may be verified that there are no sub-split equalizers installed in the amplifier. Sub-split equalizers (5-40 MHz, or 5-42 MHz) may block the OFDMA in mid-split deployment. It may be ensured that the in-line equalizers are, for example, configured as mid-split (5-85 MHz) for the mid-split deployment. A frequency response may be observed via a tool, which may provide information about OFDMA signal's adaptive equalization. Technicians may look out for in-line equalizers. It may make sense to remove in-line equalizer issues, while technicians are working on cascaded amplifier issues.

At step 2645, drop amplifiers may be identified. Drop amplifiers with "OFDMA-Partial" state or "OFDMA-Blocked" state may be randomly distributed alongside drop amplifiers with "OFDMA-Online" state or iHAT "OFDMA-Pass" state cases. These drop amplifier cases may represent the largest amount of network remediation and may therefore be addressed after all the preceding issues have been corrected. That may facilitate technicians' work efficiently addressing true drop amplifier issues, and not false-positive diagnoses from any of the preceding cases. At step 2650, troubleshooting of OFDMA-partial service or OFDMA-blocked issues may be completed.

When the spectrum on a node is activated, a number of devices that are based on DOCSIS v3.1 may be monitored pre and post spectrum activation. Those nodes which show high OFDMA-partials and low DOCSIS v3.1 modem counts post spectrum activation may be recorded and an alert may be sent out. The threshold for these alerts may be set, for example, when nodes have 35% OFDMA-partials. These may be the nodes which are potentially multi-home and/or plant issues and may be evaluated. Obtaining a list of the device's MAC address on a node which both passed the iHAT test (using OFDMA) and those that have OFDMA-blocked (not using OFDMA and were upstream partial prior to the iHAT test being run) may be useful for triage. The CM mac address for the time right after the CRD update was pushed to the node and the OFDMA being activated to just before iHAT was run may be obtained. After iHAT is run data for the OFDMA-Blocked and OFDMA-Passed cable modems can be obtained from the iHAT.

The MAC addresses may be correlated to physical street addresses for assessing incorrect amplifiers. This can be completed by creating two lists of MAC addresses, a first list of MAC addresses associated with devices where iHAT resulted in "OFDMA-Pass" and a second list of MAC addresses associated with devices where iHAT resulted in "OFDMA-Blocked." The two lists of MAC addresses may be compared for obvious patterns. For example, if there are many MAC addresses for both "OFDMA-Pass" and "OFDMA-Blocked" on the same streets, such may indicate drop amplifiers as the cause. For example, if there are clusters of MAC addresses where all devices are not using OFDMA that have an amplifier between the devices and node, this may indicate that the amplifier is not passing the OFDMA channel. For example, if there are MAC addresses associated with apartment buildings or MDUs that are not using OFDMA, this may indicate an undocumented amplifier, a riser amplifier within the buildings or MDUs blocking the OFDMA channel.

A plant map may be used to evaluate addresses to identify plant issues. For example, the plant map may show a Fiber Deep node (N+0) feeding an MDU and/or Apartment buildings associated with the addresses and show no outside plant amplifiers, and indicate that there is a common point for an undocumented amplifier. A high percentage, for example 40% of "OFDMA-Blocked" devices may be primarily due to a low number of devices fed from the RPD. A Fiber Deep node with a low volume of customers, less than 65 households passed (HHP), may be ruled-out for cascade or single outside plant amplifier issues. T2 plant may have 100s of customers. T1 plant may be somewhere between the Fiber Deep node and T2 plant in total households passed and may be likely sources for incorrect outside plant amplifier issues. With intermingling of "OFDMA-Pass" and "OFDMA-Blocked" modems fed from RPD, this scenario may suggest that there are MDU or drop amplifiers in some of the individual units. Physical troubleshooting may be required to fully determine the cause of the high number of OFDMA-Blocked. Technicians may lookout for any undocumented in-line equalizers which have not been removed.

For the above example, there may be several approaches to troubleshoot. For example, RPD may be ruled-out as a potential OFDMA-blocker because "OFDMA-Pass" and "OFDMA-Blocked" are intermingled on a same node. Evaluation of devices represented on a diagram (e.g., plant map) may show one node feeding the devices associated with the one node. There may be no common outside plant amplifiers to consider if the one node is a Fiber Deep node with a low number of households passed. A technician may be required to obtain access to each of the "OFDMA-Blocked" devices to remove sub-split drop amplifiers.

Alternatively, there may be many common outside plant amplifiers to consider if the node is a T2 node with a substantial volume of households passed. A technician may go to the field and make measurements with a meter. The technician may work from the node down the plant connecting to taps and verify OFDMA connectivity. After correcting the most common outside plant amplifier, the technician may also work from the end of the tap cascades of those amplifiers to validate OFDMA connectivity. If OFDMA is present at the end of the tap cascades, that may indicate that all devices on that feeder leg should be able to receive OFDMA and that there is nothing blocking OFDMA between that amplifier and the meter. If all the tap legs are verified that OFDMA is present with all of the outside plant amplifier corrections complete and iHAT reruns still indicate "OFDMA-Blocked" on this node, then it may indicate that the "OFDMA-Blocked" cases are caused by issues with drop amplifiers.

iHAT results for a node for a time period, for example, may show 48% OFDMA-pass and 40% OFDMA-blocked. Physical addresses of cable modem MAC addresses associated with OFDMA-pass (first list) and OFDMA-blocked (second list) may be generated. Looking at the two lists, it may be observed that there does not appear to be any one street that has only OFDMA-blocked. Looking at the node and addresses and at end of one of legs in a plant map, it may show that a house street address, for example, 1234 Example Street, this account and/or address is using OFMDA and indicate that all the amplifiers are correct and this leg is good. For example, on <X> Drive, there are a mix of OFDMA-pass and OFDMA-blocked, and a plant map may reveal that there are outside plant amplifiers in this leg.

The two lists may reveal that, for example, that 1364<Y> Dr. is OFDMA-pass so the plant up until that address is good. As another example, the two lists may reveal that 1356<Z> that is OFDMA-blocked and a plant map may reveal that it is past an additional line amp. After reviewing the node, addresses and plant maps, it may be determined that there is no multi-home or common plant issue. It may still be beneficial to review the plant physically and make some measurements with a meter to verify OFDMA connectivity at the ends of the plant. A technician may be required to obtain access to each of the "OFDMA-Blocked" cases to remove sub-split drop amplifiers.

A node may have high percentage of OFDMA-blocked or partials during the spectrum activation process, for example, 0% OFDMA-Pass and 100% OFDMA-Blocked according to iHAT results. A list of cable modem MAC addresses and physical addresses for OFDMA-Blocked cases may be generated.

Mapping the above information onto a plant map may reveal a network topology showing that some of the above addresses are off the node, not going through any active components and others are on <Z> Ave, both before and after any active components. The plant map may indicate that there are combinations of (1) RPD issues, (2) outside plant cascade issues, and (3) drop amplifier issues and thus may be triaged in that hierarchical order. There may be also undocumented active components, like MDU riser amplifiers, which could be blocking the OFDMA spectrum.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

For convenience, the following is a table of abbreviations used herein.

| | |
|---|---|
| ACI | adjacent channel interference |
| AGC | automatic gain control |
| AP | access point |
| API | application program interface |
| AWS | Amazon web service |
| BAU | business as usual |
| BER | bit error rate |
| bps | bits per second |
| CM | cable modem |
| CMTS | cable modem termination system |
| CPE | customer premises equipment |
| COS | class of service |
| COVID-19 | Corona virus disease 2019 |
| CPE | customer premises equipment |
| DAA | distributed access architecture |
| dB | decibels |
| dBc | decibels relative to a carrier |
| dBmV | decibels relative to one millivolt |
| CER | codeword error ratio |
| DAA | distributed access architecture |
| DAC | digital addressable controller |
| DOCSIS | data-over-cable service interface specifications |
| DS | downstream |
| DUT | device under test |
| EC2 | elastic compute cloud |
| EIA | electronic industries association |
| FBC | full band capture |
| FDD | frequency division duplex |
| FDX | full duplex |
| FEC | forward error correction |
| FIFO | first-in, first-out |
| FFT | fast Fourier transform |
| Gbps | gigabit per second |
| GraphQL | graph query language |
| HFC | hybrid fiber-coax |
| HD | high definition |
| HS | high-split |
| HSD | high speed data |
| HSI | high-speed internet |
| HTTPS | hypertext transfer protocol secure |
| HUSL | high-split upstream spectrum launch |
| Hz | hertz |
| iHAT | in-home health assessment tool |
| IP | internet protocol |
| ISBE | international society of broadband experts |
| ITG | interactive troubleshooting guide |
| JSON | javascript object notation |
| MAC | media access control |
| MER | modulation error ratio |
| MDU | multiple dwelling unit |
| MHz | mega hertz |
| MIB | management information base |
| MoCA | multimedia over Coax Alliance |
| MS | mid-split |
| MS-CPE | mid-split customer premises equipment |
| MUSL | mid-split upstream spectrum launch |
| NQL | network query language |
| OFDM | orthogonal frequency-division multiplexing |
| OFDMA | orthogonal frequency-division multiple access |
| OID | object identifier |
| OOB | out-of-band |
| OP2OP | output port to output port |
| OUDP | OFDMA upstream data profile |
| PDMP | point of entry DOCSIS MoCA Passive |
| PHT | performance health test |
| PMA | profile management application |
| PoC | proof of concept |
| POE | point of entry |
| PSD | power spectral density |
| QAM | quadrature amplitude modulation |
| QoS | quality of service |
| REST | representational state transfer |
| RF | radio frequency |
| RFC | remote feature control |

-continued

| RHM | remote health monitor |
| RPD | remote PHY (DOCSIS physical layer) device |
| SCTE | society of cable telecommunications engineers |
| SC-QAM | single carrier quadrature amplitude modulation |
| SIK | self-install kit |
| SNMP | simple network management protocol |
| SNR | signal-to-noise ratio |
| SS-CPE | standard-split customer premises equipment |
| SSDA | standard split drop amplifier |
| SSH | secure shell |
| SOT | source of truth |
| SOD | source of distribution |
| SQS | simple query service |
| STB | set-top box |
| TC | trouble call |
| TFTP | trivial file transfer protocol |
| TLV | type-length-value |
| TR-069 | technical report, 069 specification |
| US | upstream |
| USM | user-based security model |
| vCMTS | virtual cable modem termination system |
| VM | virtual machine |
| XOC | eXcellence operations centers |

The invention claimed is:

1. A method comprising:

sending, by a computing device and while a first device is operating in a first portion of a bandwidth, an instruction to the first device to transmit one or more upstream signals corresponding to a second portion of the bandwidth different from the first portion;

receiving an indication that a second device detected a change in a downstream signal quality associated with the one or more upstream signals; and instructing the first device to operate in the first portion of the bandwidth.

2. The method of claim 1, wherein the change in the downstream signal quality comprises an increase, in an interference level associated with one or more downstream signals, above a threshold level.

3. The method of claim 1, wherein the change in the downstream signal quality comprises a decrease, in a signal-to-noise ratio associated with one or more downstream signals, below a threshold ratio.

4. The method of claim 1, wherein the computing device is located upstream of a gateway associated with the first device.

5. The method of claim 1, further comprising:

sending, while the first device is operating in the first portion of the bandwidth, a second instruction to the first device to transmit one or more additional upstream signals corresponding to a third portion of the bandwidth different from the first portion and the second portion; and instructing, based on an indication that a downstream signal quality associated with the one or more additional upstream signals satisfies a threshold quality, the first device to operate in the third portion of the bandwidth.

6. The method of claim 1, further comprising:

receiving, prior to the instructing the first device to operate in the first portion of the bandwidth, performance data associated with a speed test performed by the first device and using the second portion of the bandwidth.

7. The method of claim 1, wherein the second portion of the bandwidth comprises:

at least 42 megahertz (MHz) and up to 85 MHz; or at least 42 MHz and up to 204 MHz.

8. A system comprising:

a first device; and a computing device comprising:

one or more processors; and memory storing instructions that, when executed by the one or more processors, cause the computing device to:

send, while the first device is operating in a first portion of a bandwidth, an instruction to the first device to transmit one or more upstream signals corresponding to a second portion of the bandwidth different from the first portion;

receive an indication that a second device detected a change in a downstream signal quality associated with the one or more upstream signals; and instruct the first device to operate in the first portion of the bandwidth.

9. The system of claim 8, wherein the change in the downstream signal quality comprises an increase, in an interference level associated with one or more downstream signals, above a threshold level.

10. The system of claim 8, wherein the change in the downstream signal quality comprises a decrease, in a signal-to-noise ratio associated with one or more downstream signals, below a threshold ratio.

11. The system of claim 8, wherein the computing device is located upstream of a gateway associated with the first device.

12. The system of claim 8, wherein the instructions, when executed by the one or more processors, further cause the computing device to:

send, while the first device is operating in the first portion of the bandwidth, a second instruction to the first device to transmit one or more additional upstream signals corresponding to a third portion of the bandwidth different from the first portion and the second portion; and instruct, based on an indication that a downstream signal quality associated with the one or more additional upstream signals satisfies a threshold quality, the first device to operate in the third portion of the bandwidth.

13. The system of claim 8, wherein the instructions, when executed by the one or more processors, further cause the computing device to:

receive, prior to the instructing the first device to operate in the first portion of the bandwidth, performance data associated with a speed test performed by the first device and using the second portion of the bandwidth.

14. The system of claim 8, wherein the second portion of the bandwidth comprises:

at least 42 megahertz (MHz) and up to 85 MHz; or at least 42 MHz and up to 204 MHz.

15. One or more non-transitory computer readable medium storing instructions that, when executed, cause:

sending, by a computing device and while a first device is operating in a first portion of a bandwidth, an instruction to the first device to transmit one or more upstream signals corresponding to a second portion of the bandwidth different from the first portion;

receiving an indication that a second device detected a change in a downstream signal quality associated with the one or more upstream signals; and instructing the first device to operate in the first portion of the bandwidth.

16. The one or more non-transitory computer readable medium of claim 15, wherein the change in the downstream signal quality comprises an increase, in an interference level associated with one or more downstream signals, above a threshold level.

17. The one or more non-transitory computer readable medium of claim 15, wherein the change in the downstream signal quality comprises a decrease, in a signal-to-noise ratio associated with one or more downstream signals, below a threshold ratio.

18. The one or more non-transitory computer readable medium of claim 15, wherein the computing device is located upstream of a gateway associated with the first device.

19. The one or more non-transitory computer readable medium of claim 15, wherein the instructions, when executed, further cause:

sending, while the first device is operating in the first portion of the bandwidth, a second instruction to the first device to transmit one or more additional upstream signals corresponding to a third portion of the bandwidth different from the first portion and the second portion; and instructing, based on an indication that a downstream signal quality associated with the one or more additional upstream signals satisfies a threshold quality, the first device to operate in the third portion of the bandwidth.

20. The one or more non-transitory computer readable medium of claim 15, wherein the instructions, when executed, further cause:

receiving, prior to the instructing the first device to operate in the first portion of the bandwidth, performance data associated with a speed test performed by the first device and using the second portion of the bandwidth.

21. The one or more non-transitory computer readable medium of claim 15, wherein the second portion of the bandwidth comprises:

at least 42 megahertz (MHz) and up to 85 MHz; or at least 42 MHz and up to 204 MH.

* * * * *